US008131779B2

(12) United States Patent
Jonker et al.

(10) Patent No.: US 8,131,779 B2
(45) Date of Patent: Mar. 6, 2012

(54) SYSTEM AND METHOD FOR INTERACTIVE MULTI-DIMENSIONAL VISUAL REPRESENTATION OF INFORMATION CONTENT AND PROPERTIES

(75) Inventors: David Jonker, Toronto (CA); William Wright, Toronto (CA); David Schroh, Toronto (CA); Pascale Proulx, Montreal (CA); Brian Cort, Toronto (CA); Alex Skaburskis, Toronto (CA)

(73) Assignee: Oculus Info Inc., Toronto (CA)

( * ) Notice: Subject to any disclaimer, the term of this patent is extended or adjusted under 35 U.S.C. 154(b) by 37 days.

(21) Appl. No.: 11/289,469

(22) Filed: Nov. 30, 2005

(65) Prior Publication Data

US 2006/0116994 A1 Jun. 1, 2006

Related U.S. Application Data

(60) Provisional application No. 60/631,597, filed on Nov. 30, 2004, provisional application No. 60/631,600, filed on Nov. 30, 2004, provisional application No. 60/706,001, filed on Aug. 8, 2005, provisional application No. 60/706,002, filed on Aug. 8, 2005.

(30) Foreign Application Priority Data

Mar. 14, 2005 (CA) ...................................... 2500573

(51) Int. Cl.
*G06F 7/00* (2006.01)
(52) U.S. Cl. ........................................ 707/811; 715/804
(58) Field of Classification Search .......................... None
See application file for complete search history.

(56) References Cited

U.S. PATENT DOCUMENTS 6,112,201 A * 8/2000 Wical ................................ 707/5
6,212,524 B1 * 4/2001 Weissman et al. ............ 707/101

(Continued)

OTHER PUBLICATIONS

European Search Report for Application No. 05257392.0; May 12, 2006; 8 pages; The European Patent Office.

(Continued)

*Primary Examiner* — Jau Shya Meng
*Assistant Examiner* — Thomas Meng
(74) *Attorney, Agent, or Firm* — Grant Tisdall; Gowling Lafleur Henderson LLP

(57) ABSTRACT

A system and method of information retrieval and triage for Information analysis provides an for interactive multi-dimensional and linked visual representation of information content and properties. A query Interface plans and obtains result sets. A dimension interface specifies dimensions with which to categorize the result sets. Links among results of a result set or results of different sets are automatically generated for linked selection viewing. Entitles may be extracted and viewed and entity relations determined to establish further links and dimensions. Properties encoded in representations of the results in the multi-dimensional views maximizes display density. Multiple queries may be performed and compared. An integrated browser component responsive to the links is provided for viewing documents. Documents and other information from the result set may be used in an analysis component providing a space for visual thinking, to arrange the information in the space while maintaining links automatically.

20 Claims, 25 Drawing Sheets

U.S. PATENT DOCUMENTS

| | | | |
|---|---|---|---|
| 6,275,229 B1* | 8/2001 | Weiner et al. | 707/3 |
| 6,707,454 B1* | 3/2004 | Barg et al. | 345/440 |
| 2003/0097357 A1* | 5/2003 | Ferrari et al. | 707/3 |
| 2003/0126136 A1* | 7/2003 | Omoigui | 707/10 |
| 2003/0217052 A1* | 11/2003 | Rubenczyk et al. | 707/3 |
| 2004/0107194 A1* | 6/2004 | Thorpe | 707/3 |
| 2005/0278741 A1* | 12/2005 | Robarts et al. | 725/46 |
| 2006/0173812 A1* | 8/2006 | Bahl et al. | 707/2 |

OTHER PUBLICATIONS

Fox E A et al.; Users, User Interfaces, and Objects: Envision, A Digital Library;Journal of the American Society for Information Science; Sep. 1993; XP-002369170; pp. 480-491.

Beaza-Yates R et al; Modern Information Retrieval; 1999; XP-002210866; Chapter10, pp. 257-339.

* cited by examiner

FIG. 2C

QUERY
A. Type query.
B. Launch query.
C. Refresh results.

SCAN
D. Scan results attributes across dimensions.
E. Scan extracted entities.

READ
F. Press Enter to read a document.

SAVE
G. Drag into the Sandbox to save.

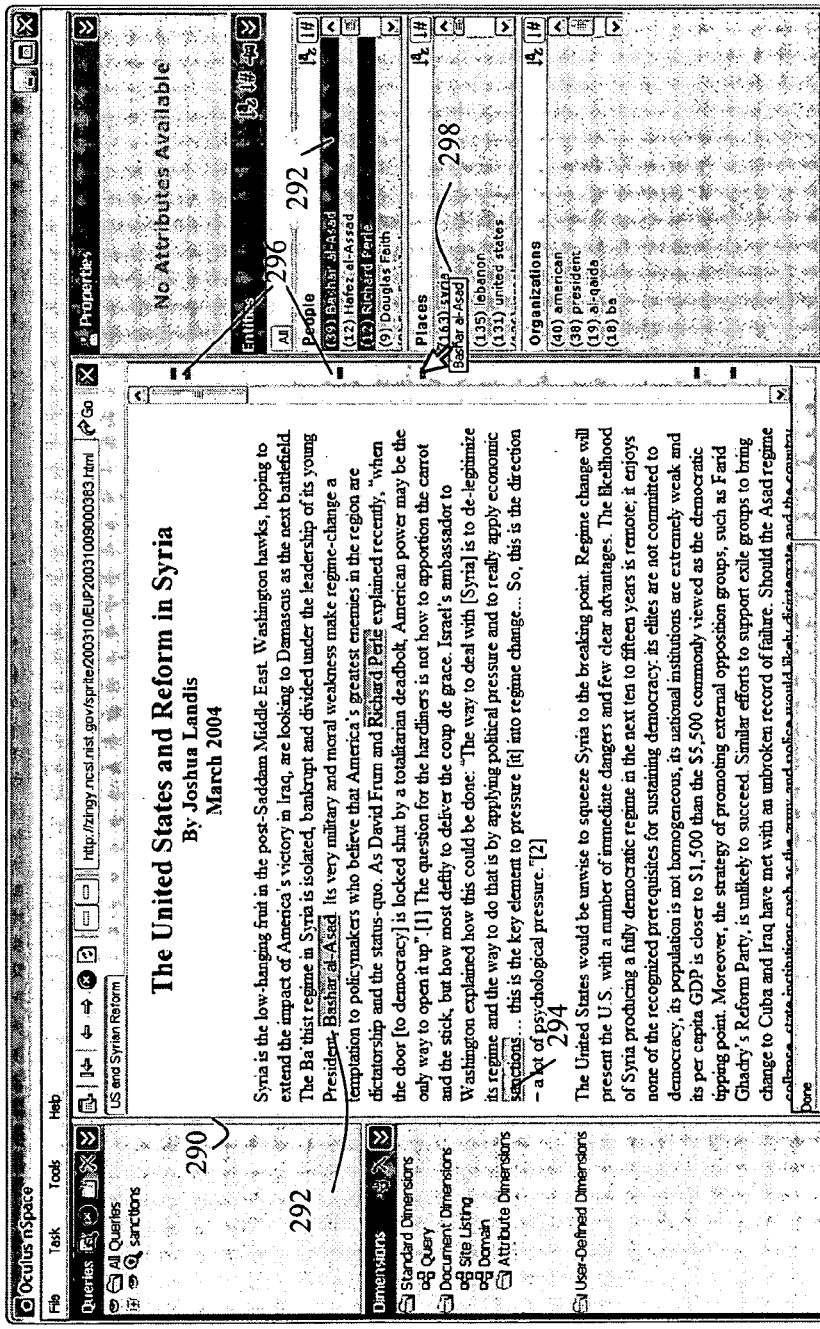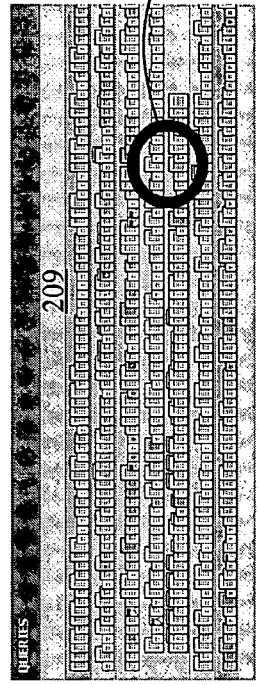
FIG. 20A
FIG. 20B

SYSTEM AND METHOD FOR INTERACTIVE MULTI-DIMENSIONAL VISUAL REPRESENTATION OF INFORMATION CONTENT AND PROPERTIES

I. CROSS-REFERENCE

This application claims the benefit of U.S. Provisional Application No. 60/631,597, filed Nov. 30, 2004, U.S. Provisional Application No. 60/631,600, filed Nov. 30, 2004, U.S. Provisional Application No. 60/706,001, filed Aug. 8, 2005, and U.S. Provisional Application No. 60/706,002, filed Aug. 8, 2005, each of which is incorporated herein by reference.

II. FIELD OF THE INVENTION

This application relates to information retrieval and triage for information analysis and more particularly to a system and method for interactive multi-dimensional visual representation of information content and properties.

III. BACKGROUND OF THE INVENTION

Many aspects of the analyst's task of finding useful information among massive data are supported by advanced search engines but which end up using a display of results that list a very few documents (i.e. 10 to 20). This is true for analysis related to competitive intelligence, issues monitoring, financial industry compliance investigations and media awareness to name a few. Required are interactive, information visualization techniques that are tightly coupled with massive data, software agents, search engines and the analyst's exploration task.

Executing queries, sequentially scanning results, opening and reading documents is a common workflow. Queries are often iteratively refined, can become quite complex, or be freshly developed and established as new thoughts are followed like trails. Results are scanned for when written, source, buzzwords, keywords, corroborating evidence, new items, trustworthy baseline document, summaries, relevance, etc. The nature of the data is varied and voluminous. The amount of information available is quickly escalating in quantity. People feel overwhelmed working now with just hundreds of items such as observations, reports and events, but if analysts were able to work with thousands, tens of thousands or more of items, they would. Keeping track of sources and queries is time consuming. Fatigue and cognitive strain are factors. Analysts need an information retrieval (IR) system that will increase their productivity in a 'triage' workflow without removing information on which human judgments can be accurately and quickly made.

Analysts report the need for an integrated human-information interaction (HII) environment: "The structured interviews provided observations of how analysts work, and think about their work, and attempt to cover the whole analytical process . . . . Analyst work is not sequential, and moves back and forth, from one stage to another, across multiple tasks at a moment's notice. There is a need for an integrated approach for supporting analysts." [Wright & Kapler, 2004].

In order to be successful such an integrated environment ideally ought to be a fluid and flexible medium of analysis and expression. It should seek to provide a common visual vocabulary for analytic work, creating a mixed-initiative environment for the whole analysis workflow and a workspace ready for collaboration. Primarily, it is the cognitive space where the analyst will see, and interact with, more information, more quickly, with more comprehension. Analysts also need a system that can easily integrate new/different IR technologies. There is an opportunity for a test bench approach. Not every method performs the same in the context of all tasks. Analysts need a way to determine which tools and methods are most effective for the task at hand. Finally, information seeking is only one part of the full work process, and must be connected with sense-making.

A number of systems have been proposed in the past that use themes developed further in TRIST. However none of these systems combine all of the functionality of TRIST into a coherent, integrated single display environment, and do so with the number of documents, number of characterizing dimensions and range of interactive, easily-accessed functionality.

DLITE [Cousins, 1997], is an early example of a graphical query system that uses iconic representations of queries and results. The system supports reusable queries, different workspaces for different tasks, and incorporates multiple search engines. DLITE does not, however, integrate the scanning and selection of information from the search results nor take advantage of auxiliary data and/or characteristics associated with the returned results.

Sparkler [Havre, 2001], now called Surmise, shows identical results across queries and provides comparison of results from multiple queries or multiple search engines. However, the system only connects identical documents and provides no way beyond the comparison for quickly characterizing and evaluating the documents or result sets.

The Envision [Nowell, 1993-1997], and similar Search Result Explorer [Andrews, 1999] systems group search results by displaying documents in a 2-D grid according to their metadata. There are a number of limitations to these implementations such as the per cell space limitations for displaying large numbers of documents, and the problem of how to represent document membership in multiple categories. These systems do, however, encode document meta-data in their iconic representations.

A number of systems have been developed for representing relevance of documents, and improving document scanning, by indicating or summarizing the location of query terms. TitleBars [Hearst, 1995], represents documents as bars that show relative locations and densities of query terms allowing the user to visually assess the quality of the match. Stacking bars for a single document from multiple queries allow the user to compare the documents match to the queries and so estimate the contents of the document. SeeSoft [Fick, 1994] displays documents as columns painting colour-coded lines for term matches. These systems are designed to work with a one-dimensional list of ten to twenty documents.

Rainbows [Hetzler], is a visualization of relationships between entities, for example documents. Entities are placed on the plane. Colour-coded arcs above or below the plane as well as proximity, indicate different types of relationships. Rainbows does not, however, offer much ability of simultaneously expressing meta-data regarding those entities, nor does it scale beyond relationships among ten to twenty documents.

Finally, PathFinder offers a broad range of functionality through a suite of tools with many separate, single purpose displays but does not offer an integrated view. Pathfinder operates on large numbers of documents but the displays aggregate (e.g. count of totals) occurrences. Also PathFinder is not a visualization tool, its emphasis is not on taping the analysts perceptual abilities to aid discovery tasks.

IV. SUMMARY OF THE INVENTION

There is provided a system and method for interactive multi-dimensional visual representation of information content and properties. The system and method disclosed herein may be implemented in computer software for execution on or by computer hardware as a tool. The tool and associated elements provides a set of multi-dimensional linked views aimed towards supporting the workflow of analysts searching for intelligence among massive data.

The tool and associated elements provide an information retrieval system that supports searching, rapid scanning over thousands of search results in one display, browsing and extraction of information for later review and analysis.

The tool and associated elements provide aids to query planning, a multi-dimensional space for result characterization and correlation, and an integrated document viewer. Query comparison may be rapidly visualized and searches refined to improve performance. Custom and automatic categorization is facilitated to provide layouts to reflect task-relevant properties, thought processes and assumptions. Automatic categorization may reveal themes and reduce human document reading. Entity-based searching is enhanced to facilitate information selection and correlation, particularly in an entity relations dimension.

The tool and associated elements may be integrated or otherwise used with a visual evidence-marshalling information analysis component (e.g. Sandbox™, a trade mark of Oculus Info Inc.) to provide interactive visual representation of information content and relationships using layout and gestures.

Accordingly, the tool seeks to facilitate an analyst to perform a human and machine assisted processing of unstructured knowledge, primarily in the form of text, into structured meaning.

V. BRIEF DESCRIPTION OF THE DRAWINGS

A better understanding of these and other embodiments of the present invention can be obtained with reference to the following drawings and detailed description of the preferred embodiments, in which:

FIG. 2B is an other screen shot of the visualisation tool and FIG. 2C is a further screen of the visualisation tool and integrated analysis component showing workflow patterns;

FIGS. 10A-10E are representative views of portions of the visualisation tool highlighting query planning and query results scanning and information visualisation in accordance with an embodiment;

FIG. 20A is a representative document in a document viewer of an embodiment of the visualization tool and 20B is a view of query results highlighting documents previously opened in the document viewer.

VI. DETAILED DESCRIPTION

The following detailed description of the embodiments of the present invention does not limit the implementation of the invention to any particular computer programming language. The present invention may be implemented in any computer programming language provided that the OS (Operating System) provides the facilities that may support the requirements of the present invention A preferred embodiment is implemented in the Java computer programming language (or other computer programming languages in conjunction with C/C++). Any limitations presented would be a result of a particular type of operating system, computer programming language, or data processing system and would not be a limitation of the present invention.

Figure 1A:
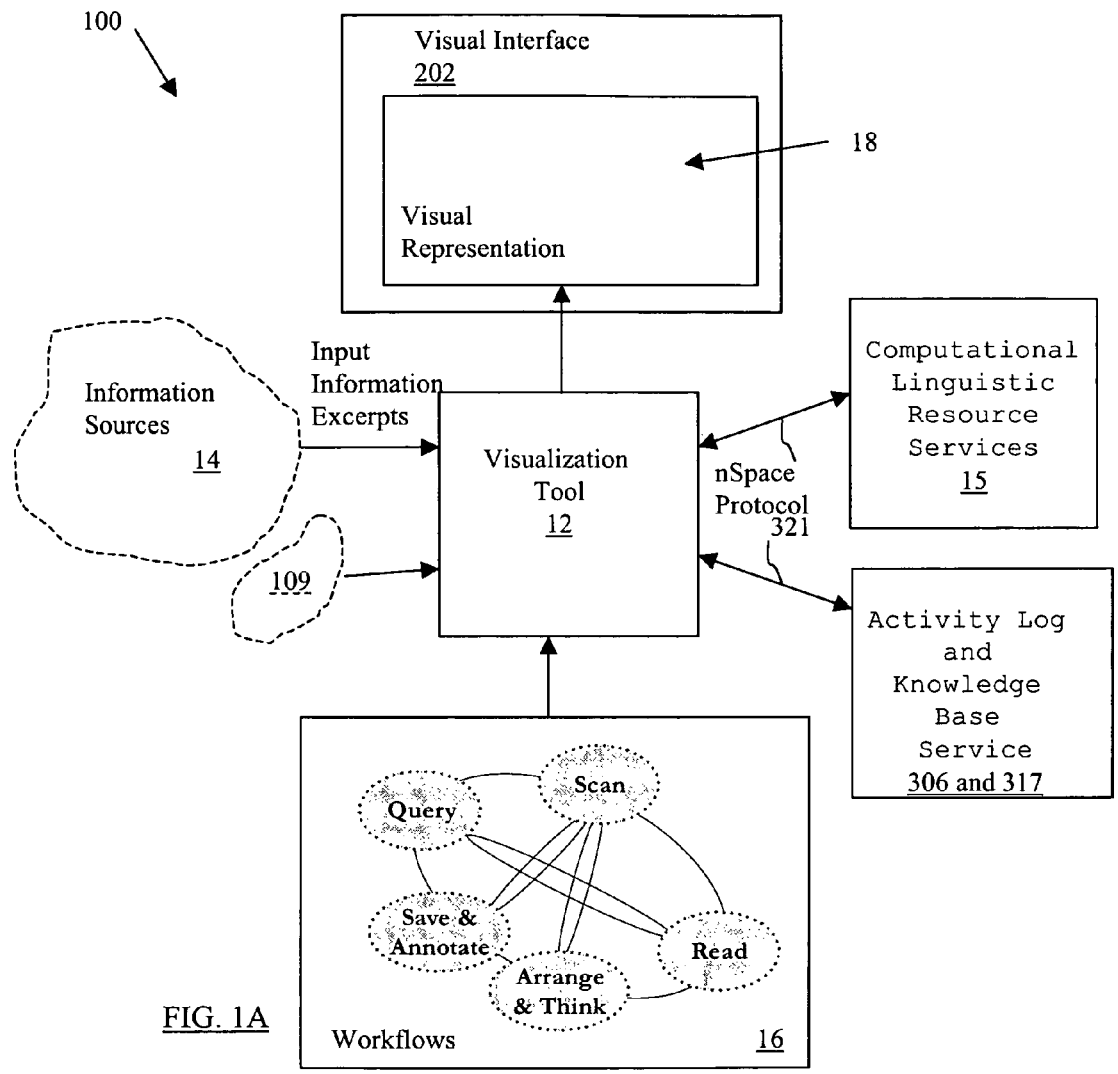
FIG. 1A is a block diagram of a data processing system for a visualization tool and FIG. 1B is a block diagram of further details.

Referring to FIG. 1A, a visualization data processing system 100 includes a visualization tool 12 for processing a collection of information sources 14 (documents, Web pages, images, text, etc.) to provide visually emphasized indications of trans/multi-dimensional document/Web page relationships, presented as a representation 18 of the information sources 14 on a visual interface 10. The information sources 14 can be combined with selected user (i.e. analyst) workflows 16 of the tool 12, user analytical content, dimensional relationships, along with optionally integrated analysis component to generate an interactive visual representation 18 on the visual interface (VI) 10. Management of the information sources 14, tool 12, and workflows 16 are driven by user events 109 of a user (not shown) via a user interface 108 (see FIG. 1B) during interaction with the visual representation 18. Additionally, the tool 12 interfaces via a protocol (nSpace protocol 321) to various Web services (e.g. computational linguistic resource services 15 and activity log and knowledge base service 306 and 317) described further below.

The analyst's workflow 16 is a non-linear, iterated sequence of search and discovery that aims for retrieval of a complete and relevant information space, and analysis of those data to find patterns and trends. The desired workflow 16 to be supported by the system 100 is characterized by five stages: Query, Scan, Read, Save and Annotate and Arrange and Think. These stages iterate in any order as discoveries from one stage will inspire exploration within some other stage.

Figure 1B:
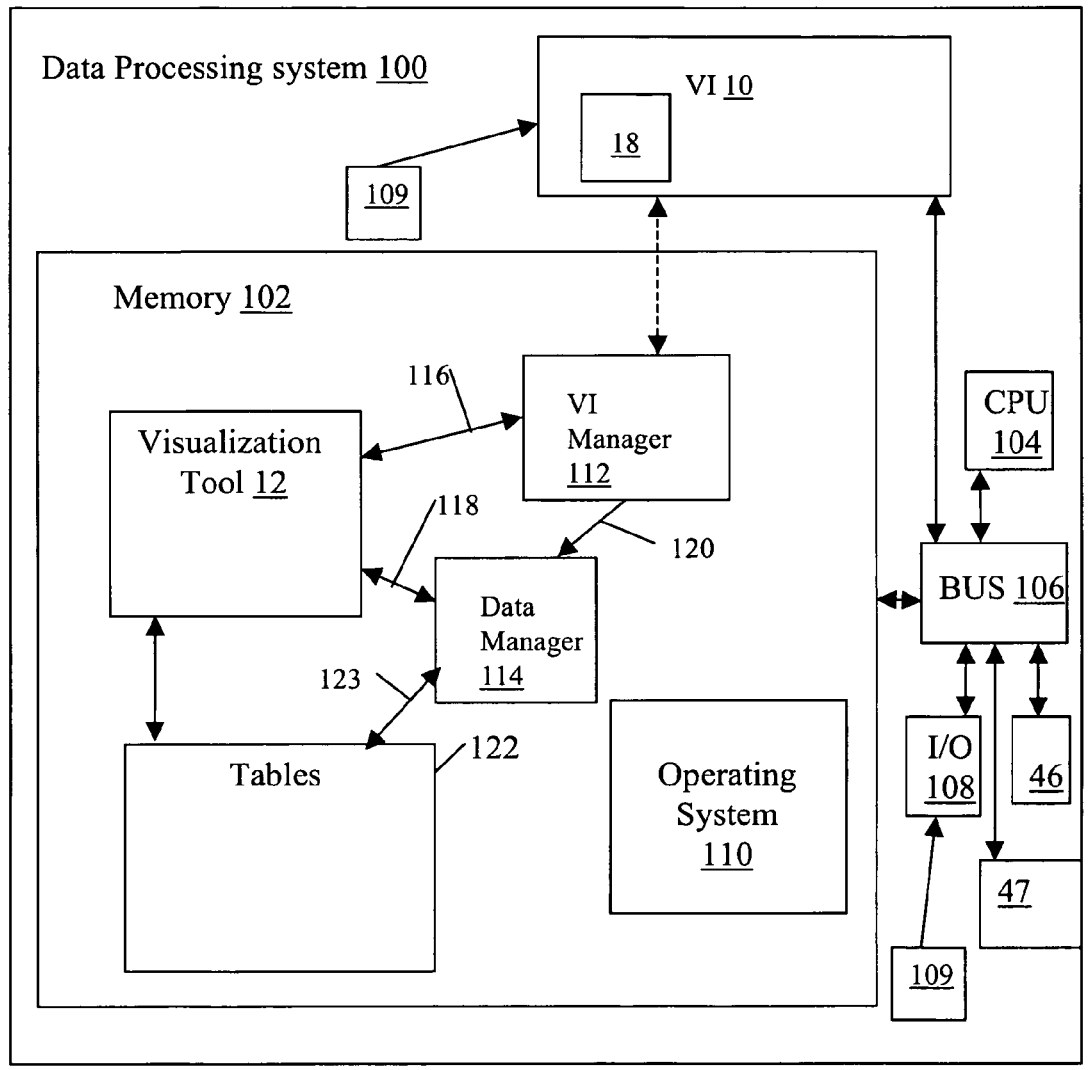

Referring to FIG. 1B, the data processing system 100 has the user interface device(s) 108 for interacting with the tool 12, the user interface device(s) 108 being connected to a memory 102 via a BUS 106. The interface device(s) 108 are coupled to a processor 104 via the BUS 106, to interact with user events 109 to monitor or otherwise instruct the operation of the tool 12 via an operating system 110. The user interface device(s) 108 can include one or more user input devices such as but not limited to a QWERTY keyboard, a keypad, a trackwheel, a stylus, a mouse, and a microphone. The visual interface 10 is considered to be a user output device, such as but not limited to a computer screen display. If the screen is touch sensitive, then the display can also be used as a user input device as controlled by the processor 104. Further, it is recognized that the data processing system 100 can include a computer readable storage medium 46 coupled to the processor 104 for providing instructions to the processor 104 and/or the tool 12. The computer readable medium 46 can include hardware and/or software such as, by way of example only, magnetic disks, magnetic tape, optically readable medium such as CD/DVD ROMS, and memory cards. In each case, the computer readable medium 46 may take the form of a small disk, floppy diskette, cassette, hard disk drive, solid-state memory card, or RAM provided in the memory 102. It should be noted that the above listed example computer readable mediums 46 can be used either alone or in combination. System 100 further comprises a network interface 47 comply the system 100 for communication with one or more public or private networks searches a LAN and/or the Internet.

Referring again to FIG. 1B, the tool 12 interacts via link 116 with a VI manager 112 (also known as a visualization renderer) of the system 100 for presenting the visual representation 18 on the visual interface 10. The tool 12 also interacts via link 118 with a data manager 114 of the system 100 to coordinate management of the information sources 14 and associated information excerpts, analytical content, and multi-dimensional relationships from data files or tables 122 of the memory 102. It is recognized that the sources 14 and related information excerpts, analytical content, and multi-dimensional relationships could be stored in the same or separate tables 122, as desired. The data manager 114 can receive requests for storing, retrieving, amending, or creating the sources 14 and excerpts, analytical content, and multidimensional relationships via the tool 12 and/or directly via link 120 from the VI manager 112, as driven by the user events 109 and/or independent operation of the tool 12. The data manager 114 manages the sources 14 and excerpts, analytical content, and multi-dimensional relationships via link 123 with the tables 122. It is recognized that the tables 122 could also contain predefined or otherwise stored information excerpts, analytical content, and multi-dimensional relationships already generated by the tool 12, as further described below. Accordingly, the tool 12 and managers 112, 114 coordinate the processing of sources 14, excerpts, analytical content, and multidimensional relationships, retrieval and implementation of workflows 16 with user events 109, with respect to the content of the screen representation 18 displayed on the visual interface 10.

Figure 2A:
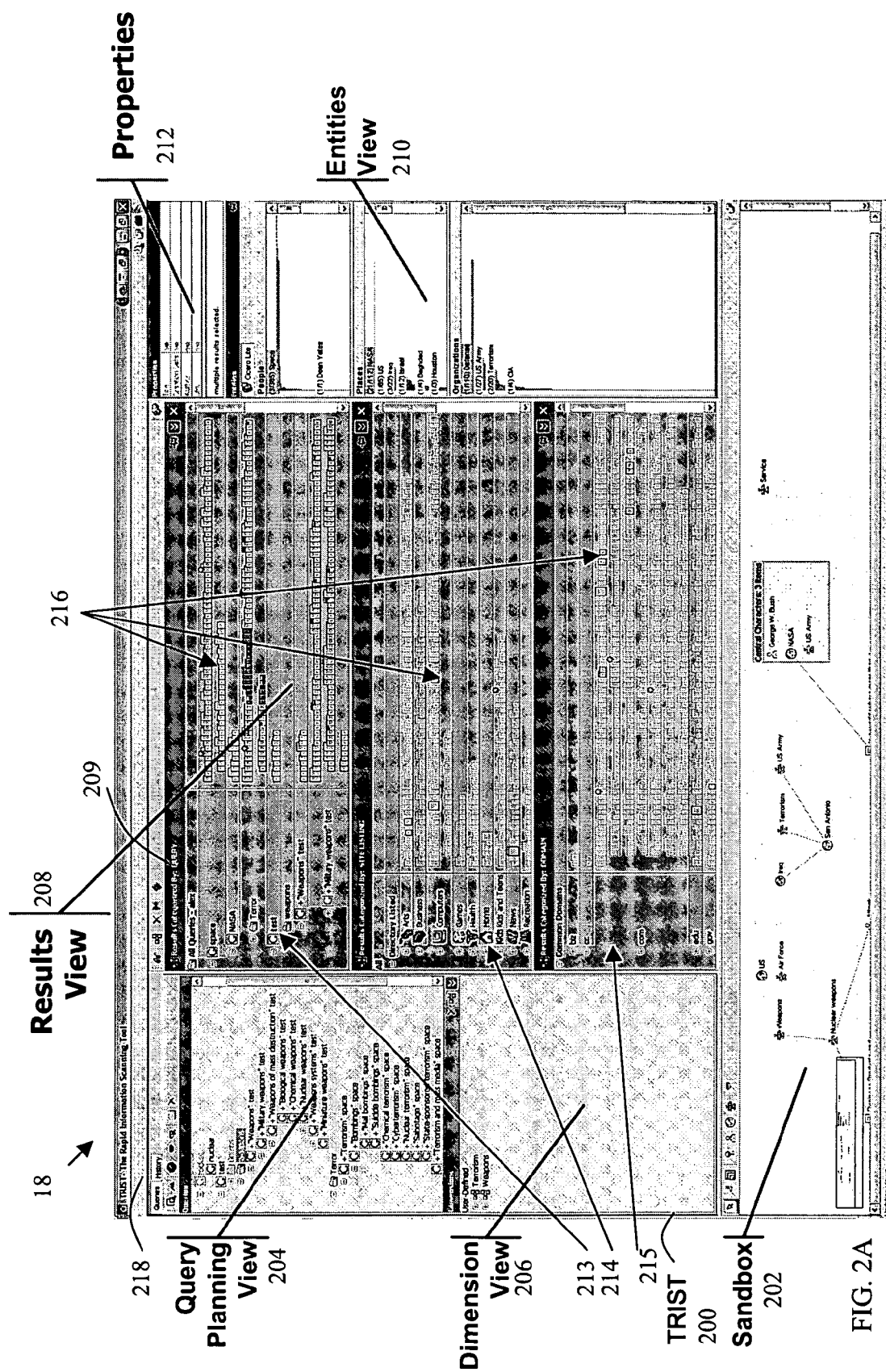
FIG. 2A is a representative screen shot of the visualization tool and an integrated analysis component showing dimension views and other views in accordance with an embodiment thereof.

Referring to FIG. 2A, the tool 12 has two basic components namely a component for interactive multi-dimensional visual representation of information content and properties via a user interface TRIST 200 and an integrated analysis component Sandbox 202. To support NIMD objectives, the system 100 provides new interactive, information visualization techniques that are tightly coupled with massive data, software agents and the analyst's exploration task. It is believed that a break-through in finding novel intelligence is possible if all the components are combined together in a system of systems. Initial experiments have shown that analyst work product quality can be increased, in half the time, while reading double the documents.

Together, TRIST and Sandbox (200 and 202) are referred to as "nSpace" (a trade mark of Oculus Info Inc.). As shown in FIG. 2A, nSpace is the combination of the multi-dimensional linked views of information sources 14 found in TRIST 200 and the cognitive exploration and development mechanisms in Sandbox 202, used to represent information excerpts and their interconnections to one another and the respective original sources 14 (as well as interconnections between documents/Web pages) via a user interface. TRIST component 200 of tool 12 is an information retrieval system that supports searching, rapid scanning over thousands of search results of information sources 14 (such as but not limited to documents—both text and image—and/or information links—e.g. a Web page) in one display, browsing and extraction of information excerpts from the sources into Sandbox 202. TRIST 200 can include aids to query planning, a linked multidimensional space for result characterization and correlation, and an integrated document/link viewer.

Sandbox 202 is a flexible and expressive thinking environment. It is a space literally focused on 'Human Interaction with Information', such that local collections of information excerpts with user attached links, associations, hypotheses, comments, annotations and other inter- and intra-excerpt connections are represented visually in the representation 18. For example, the analysis content of the information excerpts produced through use of Sandbox 202 (e.g. assumptions, inferences, evidence tied to hypotheses, explanations) is such that the analysis content is visually linked to the information excerpts and may also be visually linked back to the information sources 14 of the respective information excerpts displayed in Sandbox of the representation 18. Manipulation and organization of information excerpts is direct and very tactile. Intuitive iconic representations of entities, concepts and relations as information excerpts constitute a common, shared visual vocabulary. This is a visual thinking space for considering evidence in multiple arrangements, designed for user driven tactics in evidence marshalling and sense making like "people-places-organizations-events" cognition or "put-this-there" cognition. Placement, a 'put-this-there' process of organization by the analyst is used to encode meaning in the layout. Like or related things are placed near each other. Aspects of Sandbox are further described in the present assignee's U.S. Provisional Patent Application No. 60/706, 001 filed Aug. 8, 2005, entitled "System And Method For Interactive Multi-Dimensional Visual Representation Of Information Content And Relationships Using Layout And Gestures" of Wright et al. and U.S. patent application Ser. No. 11/189,381, entitled "System And Method For interactive Multi-Dimensional Visual Representation Of Information Content And Relationships Using Layout And Gestures" of Wright et al. flied on even date herewith and Canadian Patent Application No. 2,500,573, filed Mar. 14, 2006, entitled "Advance In nSpace—System and Method for Information Analysis" of Wright et al. each of which Is Incorporated herein by reference.

Referring again to FIGS. 1A and 2A-2C, the workflow 16 stages are reflected in the integrated multi-view design of TRIST 200 and the system 100 in general. The system 100 allows query results to be displayed in categories generated from a number of sources 14. The system 100, with TRIST 200 and Sandbox 202, provides indications of trans-dimensional document relationships. The system 100 highlights not only the explicit query terms that produced the document from the information sources 14, but also entities that are deemed pertinent by other sources 14 or terms used in other queries found in this document, as further described below.

With reference to FIG. 2A, TRIST 200 comprises a query planning view 204, dimension view 206, query results view (including by dimensions) 208, Entity view 210 and Properties view 212. Views may also be referenced as panes or portions of the visual display. Panes may be sized in accordance with user preferences as is well known to persons of skill in the art. Query planning view 204 displays a list of current queries and query result summaries (representing a collection of information source 14 documents, Web pages, etc.) that allow the user to organize searches, run them concurrently, and easily revise and reuse them. Reuse of saved queries can be done in situations where the information source 14 content has been updated and therefore the original saved query (and results) along with the associated analysis needs to be updated as well to reflect the changes in the original information sources 14. Results from the queries are organized by different dimensions, and displayed in the various result views 208. In these views 208 the content of the query results can be displayed as icons that represent a variety of information about the documents/Web pages/entities of the information sources 14 and their relation to all the visible results in the representation 18 of all the queries. This compact representation allows the analyst to quickly scan large information source 14 result sets from a number of queries and quickly identify commonalities and differences between sets. The search for useful information can be accelerated by early identification of features of the result set by visually examining the rhythms and anomalies in a picture of the results.

In addition to this synoptic view of many results, peripheral information on the documents is collected and displayed. Entity extraction is performed on the documents/web pages of the information sources 14 and a list of discovered entities is displayed beside the results in a separate entity view 210. Displaying the entities can help provide context for the search terms that are found in the documents returned from the query and also inspire new directions for investigation. Document level summary information (such as metadata) is also displayed on a pane 212 and in tool-tips (invoked by mousing over a document for example (not shown)) for results indicated by the analyst. For more in depth analysis individual documents represented by icons 216 can be opened and read in an integrated document viewer (See FIG. 2B). The viewer highlights entities and search terms found in the document and provides navigational aids so that the user can quickly locate passages of interest.

Figure 2B:
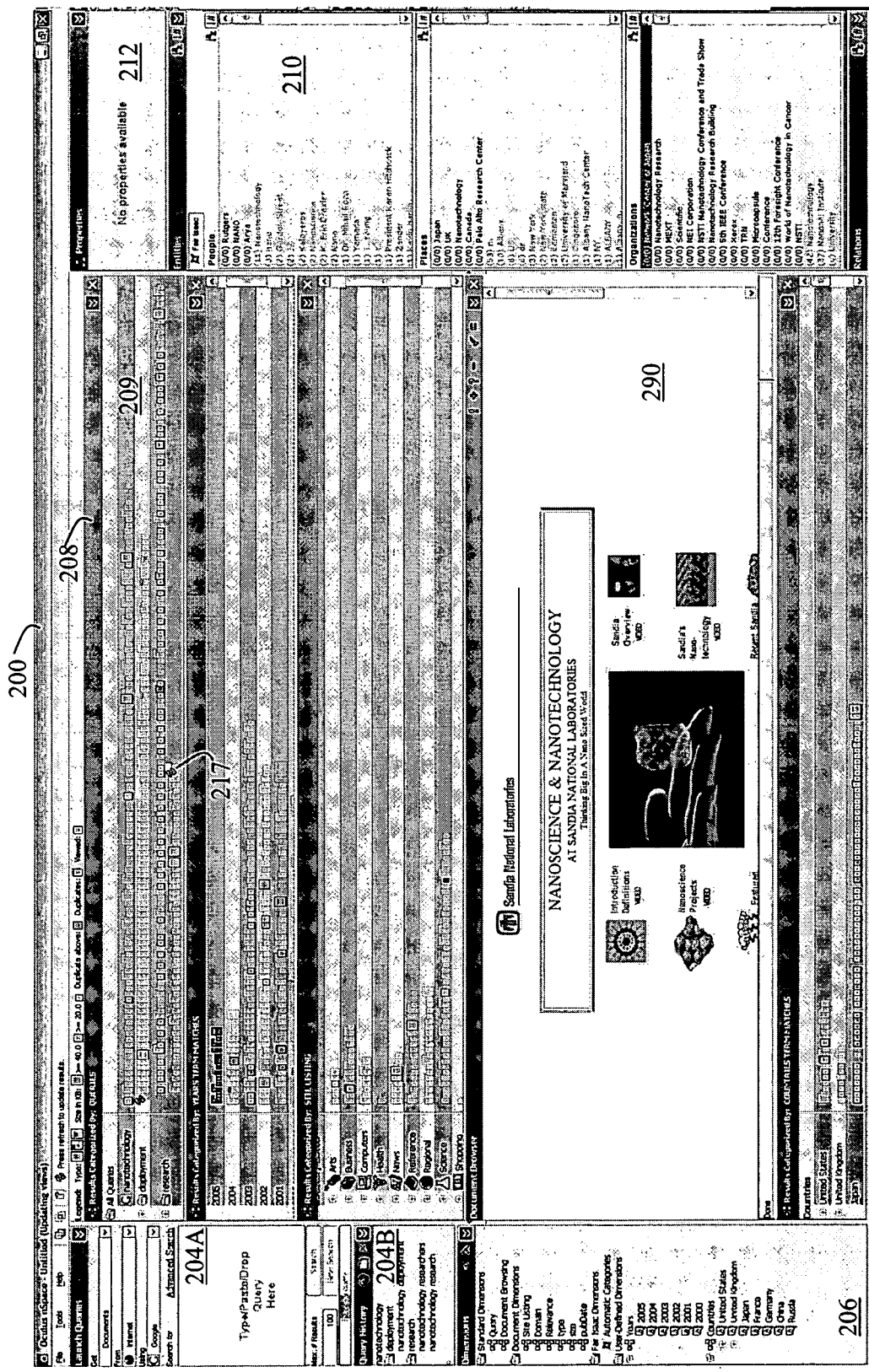

FIG. 2B shows a representative screen shot of the TRIST 200 component of the tool 12 in accordance with an embodiment where Sandbox 202 is not displayed. As well, query pane 204 is visualised as a query composition or launch portion 204A and a query history portion 204B. Further, the integrated document viewer 290 is visualised as described further herein with reference to FIG. 20A. In the launch query pane 204A, users may specify a document type (e.g. documents and image types) to search and receive, a data source to search, a search service (engine) to use, the search query which may be data elements such as entities and a search results limit such as the number of documents to receive. The query history pane 204B visualises searches in progress and completed and number of documents/entities available.

For the fourth stage of analysis, TRIST 200 supports a general drag-and-drop mechanism that allows Sandbox component 202 to receive documents, singly or in groups, entities, and fragments of documents. This area provides a workspace for the analyst to review and store discoveries as well as organize thoughts, hypotheses and evidence, as further described below.

The fifth stage of analysis is accommodated through the use of Sandbox. Allowing the user to arrange information in groups that are logical to both the thought process and also the explanation of the research. When working with large amounts of information, manually clustering related items and displacing unrelated items leads to gestalt discoveries of gaps and connections in the data.

Although the previously mentioned views are separate, the TRIST 200 link-selection mechanism (for providing visual based emphasis on connectivity of inter and intra document/Web page/entity and query content) allows the analyst to quickly find connections between entities and documents and queries, and even their counterparts exported to Sandbox 202. Items highlighted (or otherwise visually emphasized—such as but not limited to use of similar colour schemes, bolding, sizing, ghosting, etc.) by the user in one view have associated items in other views brought to the foreground (or otherwise visually emphasized). In this way connections such as those between entities and documents and between documents and dimensions, and between queries, documents, entities, dimensions are explicitly made visible to the user who can then explore trails of connectivity through a large set of documents without needing to resort to a close examination of the text of the various queries, documents/web pages, entities, and analytical content.

Further description on Views 204-212 is given below in the Visual Elements section. The following will describe the TRIST component 202 of the system 100 in outlining the information model (system architecture, application architecture, knowledge representation) to describe the underpinnings of the application and how it represents knowledge and the users task. Further, the visual elements, describing the way that TRIST 202 uses imagery to improve the density and clarity of the data displayed. Further, Sandbox workspace 204 of the system 100 is described. Finally the Interaction elements describe the main functionality and uses of the system 100, both TRIST and Sandbox elements, in the context of the analyst's workflow 16 (see FIG. 2C).

Figure 3:
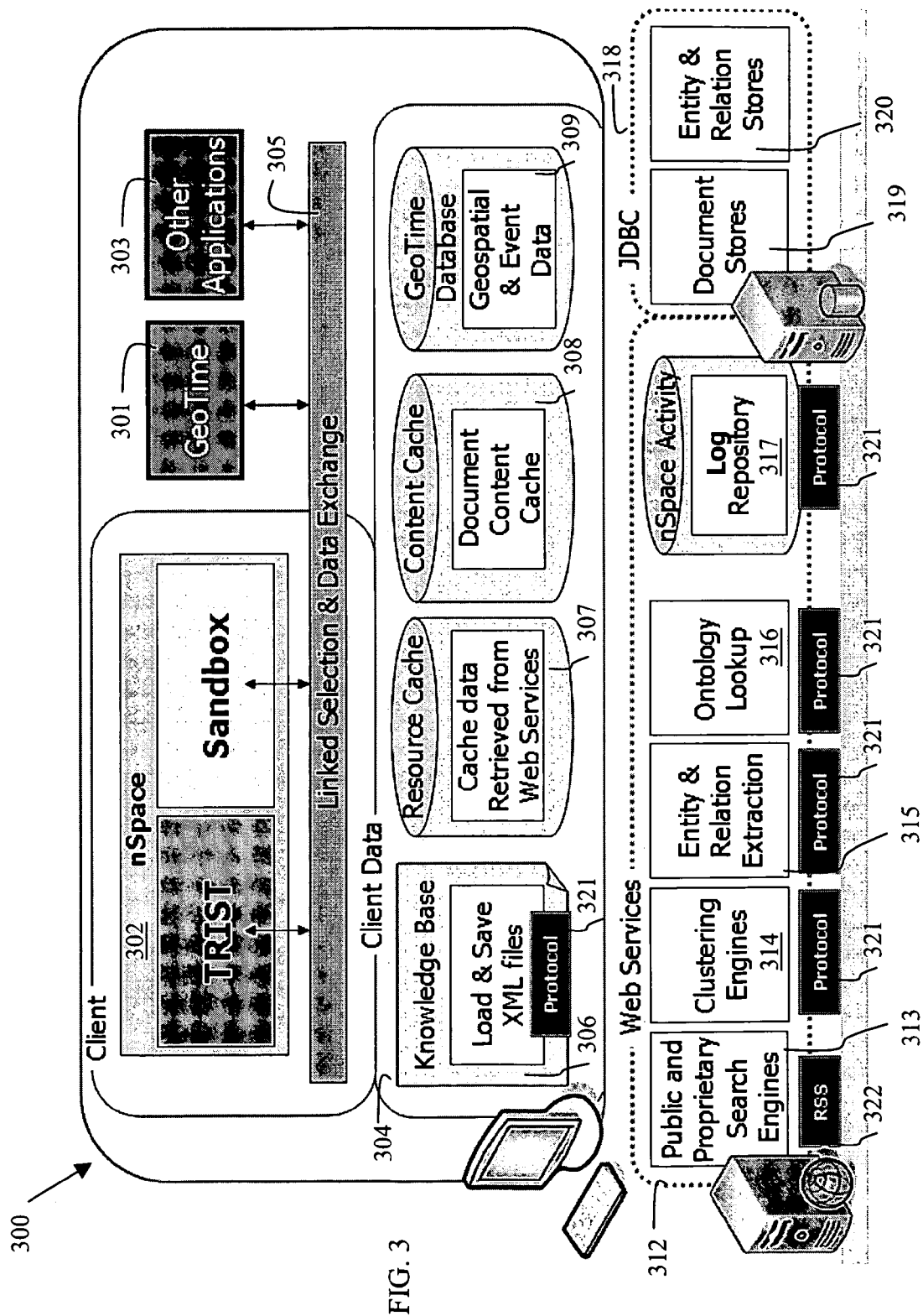
FIG. 3 is a block diagram of computer system architecture in accordance with an embodiment of the visualization tool.

FIG. 2C is a representative screen shot of TRIST 200 and Sandbox 202 and showing an example workflow 16 facilitated by tool 12. In the example, a user may perform the following tasks fluidly interacting with various portions of the tool:

A. Type query
B. Launch query
C. Refresh results
D. Scan results attributes across dimensions
E. Scan extracted entities
F. Press Enter to read a document
G. Drag into the Sandbox to save TRIST System—System Architecture FIG. 3 is a block diagram of computer system architecture in accordance with an embodiment of the visualization tool 12. System components 300 of tool 12 comprise a client application 302 providing an integrated information retrieval and analysis tool (nSpace, comprising TRIST and Sandbox respectively), optional application components such as GeoTime™ 301 (GeoTime is a trade mark of Oculus Info Inc.) and other application components 303 and client data components 304. A link selection and data exchange mechanism 305 couples the nSpace client application components of TRIST and Sandbox and may be used to couple to the optional additional applications 301 and 303. Client data components 304 comprises nSpace knowledge base 306, resource cache 307 of cached data retrieved from Web services 312, content cache 308 of document content, and optionally, a GeoTime database 309 of geospatial and temporal data that is associated with events and entities as well as connections between those data The GeoTime application 301 and database 309 are described in U.S. patent application Ser. No. 11/078,330 filed Mar. 14, 2005 and entitled, "System And Method For Visualizing Connected Temporal And Spatial information As An Integrated Visual Representation On A User Interface" the contents of which are incorporated herein by reference.

nSpace client application 302 is coupled via middleware architecture (not shown) to Web Services 312 and to JDBC connected systems 318. Web services 312 comprise ad hoc and/or corpus services, such as, but not limited to, ontology services 316, entity extraction services 315, clustering services 320, entity and relation extraction services 315, clustering engines 314 and public and proprietary search engines 313. JDBC connected systems 318 comprise document stores 319 and entity and relation stores for persisting query results, for example.

Ontology services 316 such as an ODP directory, WordNet or Library of Congress catalogue provide information for defining dimensions with which to categorize query results or define queries. Entity extraction services 315 such as Cicero Lite™ from Language Computer Corporation extract entity information, contained in the results such as but not limited to people or places, using semantic analysis. Clustering engines 314 and entity and relationship extraction services 315 such as provided by Fair Isaac operate on "content" to extract meaning (noun-phrases and their relationships, etc.) to gain an understanding of the document and return keywords to bin (categorize) a body of documents such as those previously identified by the results of a query. Clustering may be performed to generate automatic categories or dimensions.

An nSpace protocol 321, as described further herein below, may be used for at least some Web services communications such as publishing analyst activity data or communicating with computational linguistic resource services 15 such as services 314 and 315. Other standard protocols such as RSS (Really Simple Syndication) 322 may be used for Web services communications such as search queries.

The nSpace activity log and knowledge base components 306 and 317 are used to store respectively data that the analyst is working with and actions the analyst performs while working with this data. The activity log and knowledge base 306 are maintained to model the user and analyst activity is published as a Web Service 317 as also shown in FIG. 1 using the nSpace protocol 321 (e.g. to other services such as AME of Sarnoff Corporation). The knowledge and activity base uses a structured XML schema. It includes a high level analyst task characterization (e.g. query history, query results, extracted entities used, snippets, user defined dimensions, discovery clustered dimensions, etc.) as well as detailed descriptions. These are all saved and then made available in the nSpace XML schema Such activity information may be analyzed to see interests in documents, entities, relations. Examining the activity in context indicates interests and/or biases. The tool 12 may be adaptive to an analyst's preferences in accordance with the activity information gathered over time. The knowledge base and activity log data is used to provide a rich analytic activity stream for automated system initiatives. System initiated searches may be performed in anticipation of the analyst's interest or based on past analyst behaviour in similar situations.

Additional data in the store 306 may include (but is not limited to):
- terms, entities, events and relationships found from the results or entered by the analyst including attributes of these items; and
- dimensions, both user defined and automatically generated These data reference each other to show dependencies and/or links and relationships. In addition to the analyst's data, store 306 also stores information on the state of the application task (i.e. current use of the tool 12) for analysis of a respective query and information source 14 set By storing the state associated with a task the analyst can come back to the task and find the most recent context of the work intact. This allows the analyst to close the application or to work on several separate tasks and avoid losing context gained from the spatial layout of the information being analysed.

TRIST System—Application Architecture

Figure 4:
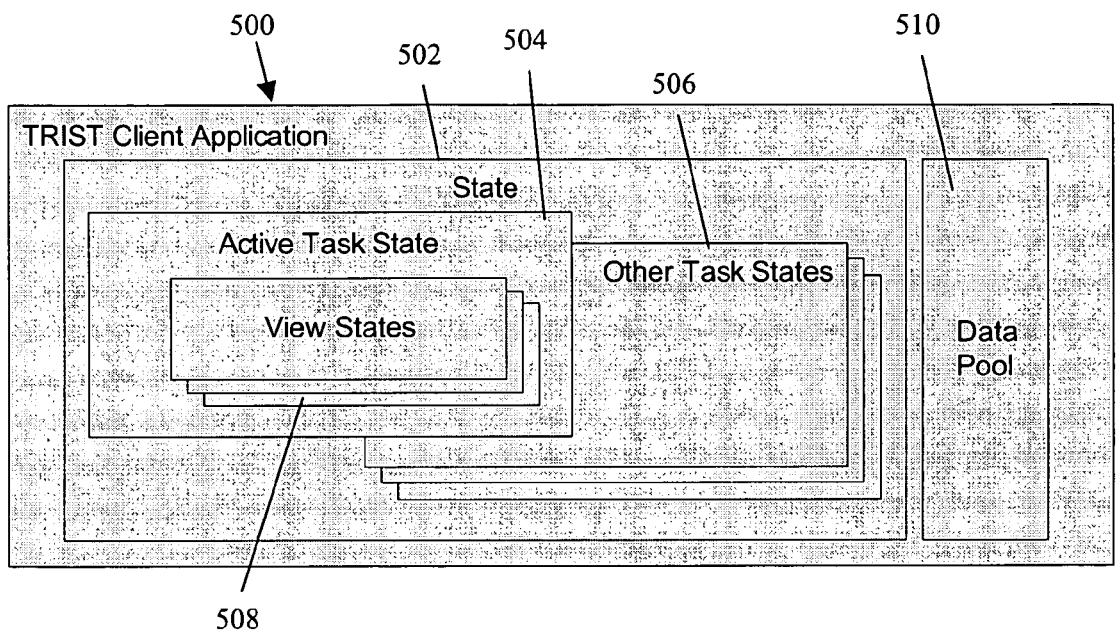
FIG. 4 is a block diagram of application architecture in accordance with an embodiment.

FIG. 4 is a block diagram of application architecture in accordance with one embodiment. The TRIST client application 500 is concerned primarily with presenting information and allowing interaction is such a way as to aid the analyst in his or her task. This section will describe some of the application's underpinnings, the state and selection mechanisms, that allow the user interface to perform its function.

The TRIST client application 500 maintains a global state object 502 that holds information on a user's current context for all the tasks the analyst may be working on. This state object 502 can be persisted in the data store 306 as a snapshot of the TRIST 200 and Sandbox 204 contents in the representation 18. Objects may be serialized using XML or other languages and techniques such as will be apparent to those of ordinary skill in the art. In addition to being available for the next use of the application, past snapshots can be loaded from the data store 306 to retrieve saved milestones or simply to review past contexts perhaps to take up old search trails that the analyst may have left in favour of others.

The global state object contains task state objects 504, 506. These correspond to the application's context for each task that the analyst is working on. The active task dictates the currently visible features and results in the representation 18 through a number of view states 508, which correspond roughly to the different panels (e.g. 202, 204, 206, 208, 210 and 212) (i.e. views) of the visual interface 10. Collectively the state records such aspects of the application such as but not limited to:
- Visible dimension nodes;
- Visible queries;
- Visible results, including which are duplicates;
- Sort order of results;
- User defined dimensions; and
- Hidden results and categories.

The state objects 502, 504, 506 work in close concert with the data pool 510. The data pool 510 is a global repository for data objects (representing the document/Web pages, relevant portions of the documents/Web pages, analytical content, and links 360—see FIG. 5—with the information sources 14 in general). Centrally maintaining data objects that are retrieved from the data store 306 allows the application to use memory more efficiently, since each data object may be allocated only once. This is important if the application is to handle large result sets. Also this simplifies the task of linked selection. The data pool is independent of state, and since it represents globally unique data objects, its contents are re-usable between task state switches, further aiding the performance of the application.

TRIST System—Multi-Dimensional Relationship—Visual Emphasis

Figure 5:
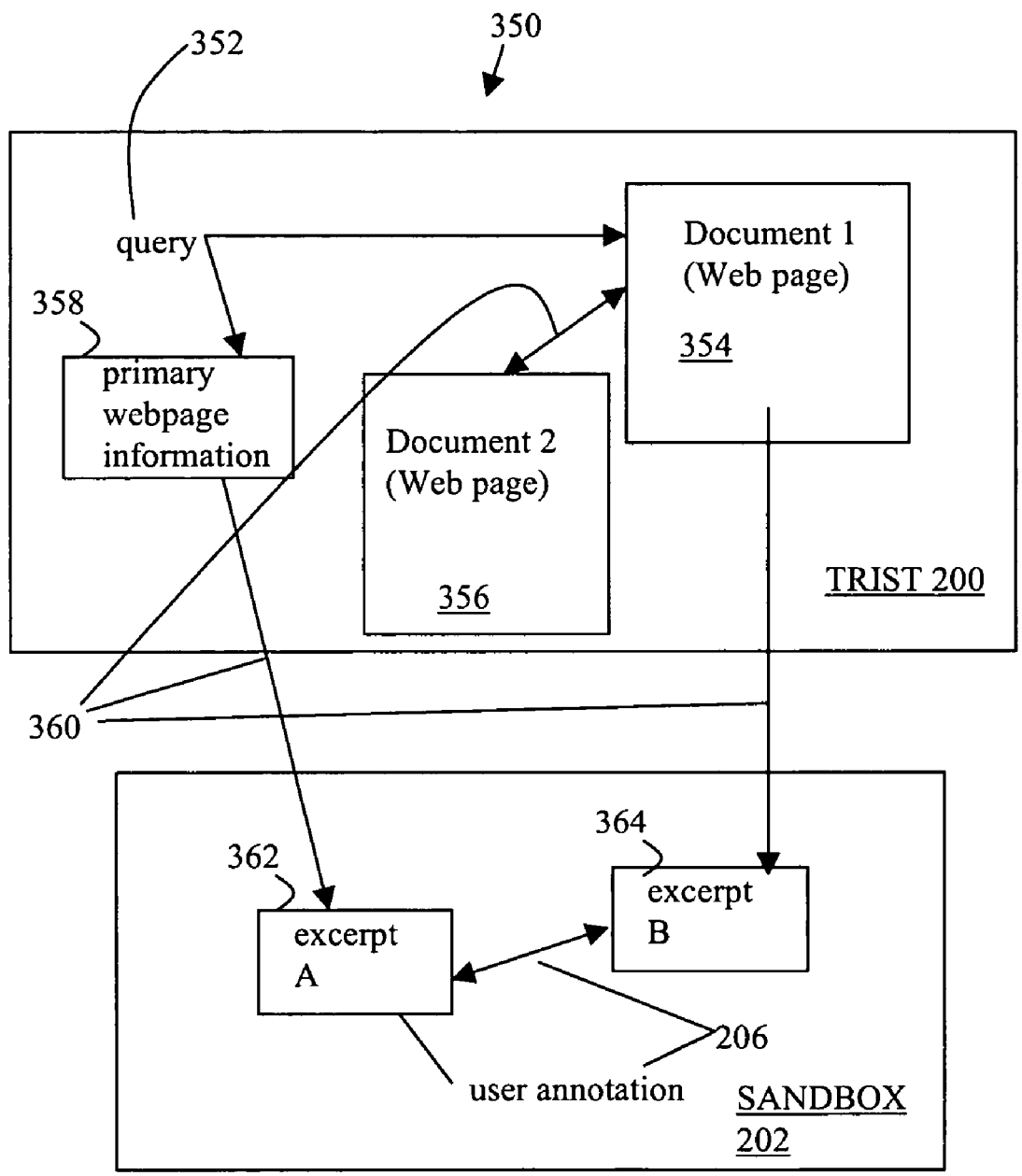
FIG. 5 is a block diagram of example links for documents and queries.

FIG. 5 is a block diagram showing relationships between data objects in a representative display 350, keeping track of sources 14 and their related queries is time consuming and thus costly. It does not seem to be the best use of the analyst's core skills and time. An integrated TRIST and Sandbox 200, 202 could reduce this overhead considerably, since the TRIST 200 query planning view keeps track of the queries and their results. Any relevant information excerpts saved in Sandbox 202 keeps its link 360 relationships to the document source 14 (e.g. 354, 356) and queries (352, 358) it came from automatically. Accordingly, the retrieval history, as well as links of other "at first glance unrelated" excerpts to the shared sources 14, of the information excerpts is associated with the respective excerpts for use by the user of Sandbox 202. It should be noted that visual elements of the link 360 would be generated by the tool 12 and shown to the user in the representation 18 for Sandbox 202, in order to represent the relationship of the excerpts A, B 362, 364 to the information sources (query 352 and document 354). The links 360 can be communicated visually to the user via the representation 18 using for example text, images, icons, or a combination thereof. It is also recognised that the link 360 details could be communicated via audio capabilities of the UI 108 to the user (e.g. speaker) either when prompted by the user or on a periodic basis (for example when the particular excerpt is selected by the user). It is also recognised that the visual communication of the links 360 to the user can be "always on" or can be done on a selective basis by the system 100 with or without user interaction. Further, the links 360 between respective documents 354, 356 and related content in the various views of the TRIST system component 200 (see FIGS. 2A-2C) can also be visually emphasized (see too FIG. 13).

The tool 12 provides linked multi-dimensional selection. Apart from the simultaneous views of the different data presented by TRIST, the linked selection mechanism demonstrates underlying connections between views and between displayed items in a highly interactive way. Selecting one or more documents in one view, selects the same document(s) in the other views. The multi-dimensional properties of selected documents are made visible because the selected documents are highlighted in each dimensional view using compact icons. The linked selection takes the first step in providing and visualizing structure for the unstructured data retrieved by the queries, making it possible to discover features that are not salient in a textual representation of query results. Typically applications use selection as a way of marking a target for some action, for example copying, TRIST uses selection as an exploration tool unto itself.

filtered (i.e. filtered out) or intersection. When the selection contains multiple data objects, the highlighted elements in other views are related to all objects in the selection are drawn in this intersection style. As multiple results or Sandbox items may indicate the same underlying data object within the same view, these also have a simultaneous selection state. The goal is to show the analyst all the pieces that are related to a selected item.

When a selection is made in TRIST all the result views, the entities view, and Sandbox all update their images to reflect relations to the selected object. The selection state occurs in the view that the selection was made. In other views, items that are related to the selected item are drawn highlighted, while all other items are drawn filtered. The effect is to make the related items stand out, as if in front of the other items. In some cases identical items can have two representations in the same view, for example two results from separate queries may refer to the same underlying document. In these cases the items are drawn as the simultaneous selection state. Identifying these states makes it easy for the analyst, for example, to identify all the entities contained in a document by selecting the document and seeing the highlighted entities, or the entities in a whole query, by selecting all the documents from the query. Conversely, a user may wish to see the documents that contain a given set of entities. Selecting entities will update the dimension views so that the analyst can see highlighted documents that contain the selected entities. Documents containing the complete set of selected entities are drawn in the intersection style.

Figure 6:
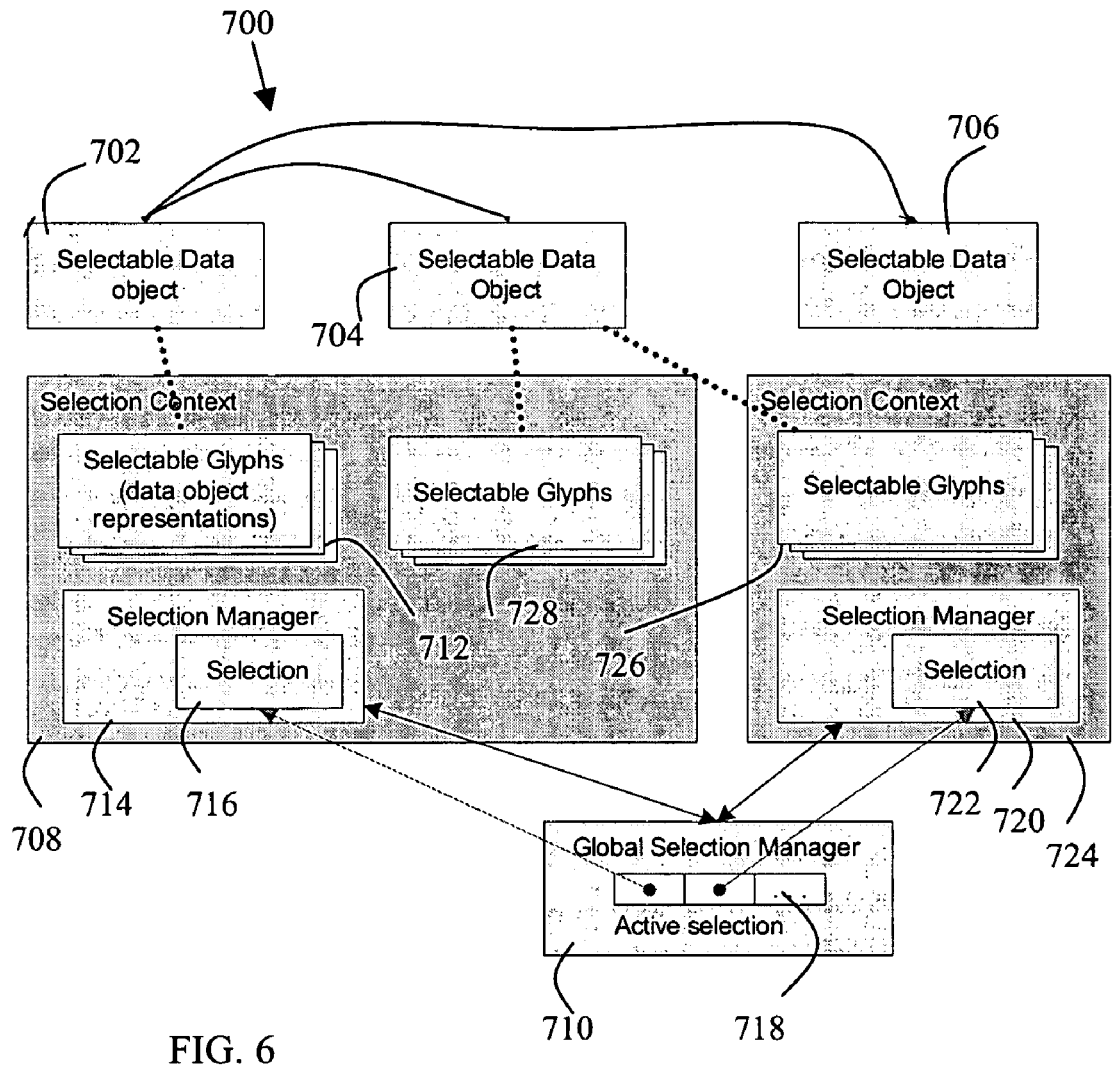
FIG. 6 is a block diagram of a link mechanism in accordance with an embodiment of the visualization tool.

Referring to FIG. 6 there is shown an embodiment of a link organiser module that provides a link selection mechanism. The linked selection mechanism of a link organizer module 700 of the tool 12 helps the analyst find connections between data objects (i.e. documents, entities, queries/results, Sandbox items, etc.). Data objects from the data pool 510 are referenced by inheritors of the selectable class. Each selectable object (e.g. 702, 704, 706) represents an underlying data object (e.g. 712, 726, 728) that can be selected by the user, but this does not include a representation. Selectable glyphs are representations of selectable objects. These are the visible

TABLE 1

Representations in different selection states

| | Selected (with focus) | highlighted or no selection | simultaneous | Filtered | Intersection |
|---|---|---|---|---|---|
| Result | ■ | ▤ | ▤ | ▤ | ▤ |
| Fragment | ▰ | ▤ | ▌ | ▤ | ▤ |
| Entity (in entities view) | (27) US Army | (1/27) US Army | — | ▬ | ▬ |
| Entity (person, place, organization in Sandbox) | 👤●⛃ | 🏛️⊙⛃ | 👤●⛃ | 🔣 | 👤●⛃ |

As shown in Table 1, results, fragments and entities may have four visual states. They can be selected, selected without focus called highlighted, and unselected without focus called aspects of data objects that populate selection contexts (e.g. 708, 724) in the various user interface views of TRIST 200 and/or Sandbox 202 of the system 100. Roughly, each pane/ view (204-212) of the TRIST 200 interface is associated with a selection manager (714, 720) and so defines the selection context of the representation(s) of the data object visible to the user in the representation 18. Note that there may be many selectable glyphs to a single selectable object, even within the same selection context.

When a selection (716, 722) of the data object(s) is made by the user, e.g. through interaction on a selectable glyph, the associated selection manager (e.g. 720) is responsible for generating a list of selected items. These are passed to the global selection manager 710 which then updates other selection contexts (e.g. 708). In this way items representing the selected objects (the selectable glyphs) that are selected in one view can be brought to the forefront of other views. Which items are brought to the forefront, or otherwise differentiated to the user of the tool 12 visually from other view(s) content, is determined by the representations having a common underlying selectable data object. The visual and interactive aspects of this topic are discussed below. Typically there is only one active selection 718, but the application also allows a selection to be pinned, that is an active selection context is locked so that subsequent selections made in other selection contexts do not clear the pinned selection context's selection. Instead the new selection is added to the global selection manager.

This method of indicating when representations share a common data object is useful for examining a result space. The system 100 also allows for another level of linking between selectable items. Selectable data objects are linked to each other by the application. For example an entity will be linked to the documents that it is found in. The global selection manager described above also communicates this linked selection to the individual selection contexts. In this way the links between data objects found by TRIST are made visually explicit (and/or via audio if desired) to the analyst using the tool 12.

TRIST System—Knowledge Representation

Figure 7:
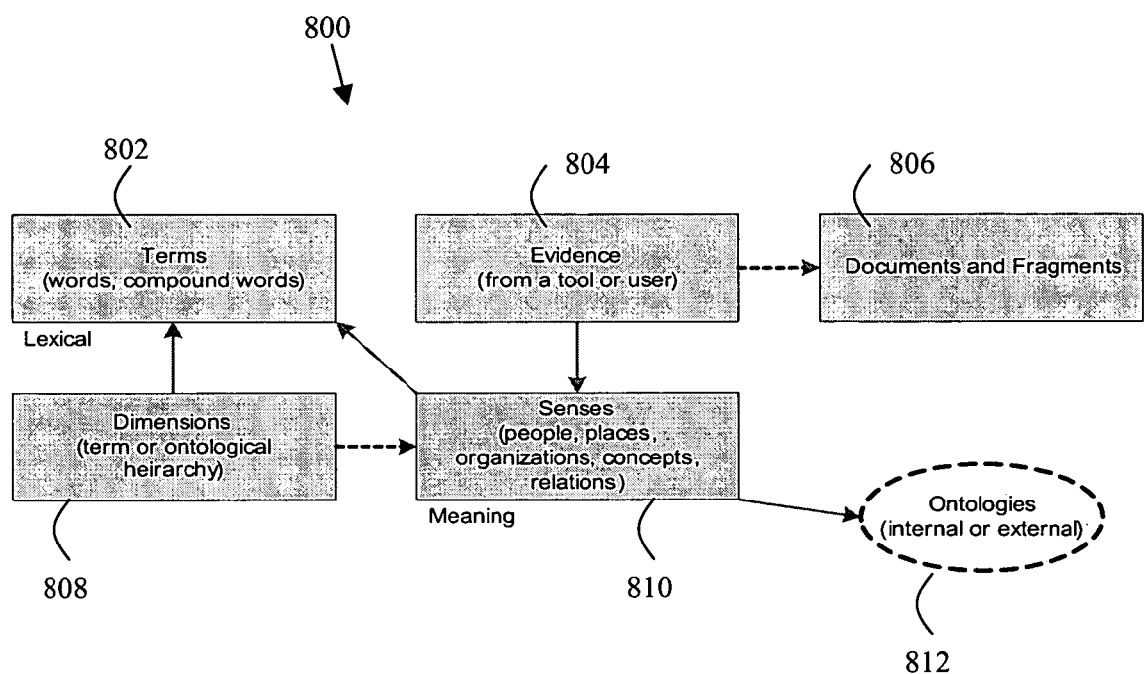
FIG. 7 is a block diagram of knowledge representation in accordance with an embodiment of the visualization tool.

FIG. 7 is a block diagram of knowledge representation 800 in accordance with an embodiment of the tool. TRIST 200 seeks to assist an analyst to transition unstructured knowledge to structured meaning. This section will describe some of the traits that the TRIST data model uses to represent knowledge. The basic starting unit for many of the represented meanings is the term 802. Terms 802, in this context, are purely lexical and so are attributed no explicit meaning. The meaningful counterparts of terms 802 are senses 810 sense data objects reference terms multiple senses may reference the same term. To help analysts find relationships between people, places and organizations, these categories are incorporated directly into TRIST as senses. More generally, TRIST also defines concept and relation senses that refer to other internally or externally stored ontologies 812. Relations are predicate senses that reference one or more other concept senses.

All senses have supporting evidence 804. The evidence 804 is the justification for why TRIST has assigned a specific meaning 810 to a term 802. A piece of evidence 804 will indicate the sense 810 that it supports and will also specify the document or document fragment 806 that is the basis for this assignment of meaning 810. Evidence 804 can also come from the user, or be generated by a tool, in which case there may be no supporting documents 806. If the evidence 804 is generated from a tool, such as an entity extractor 315, then the source tool of the evidence 804 is indicated. This helps the user to understand why a specific meaning 810 was assigned.

Another aspect of the knowledge representation 800 undertaken by TRIST 200 is the dimensions 808. Dimensions 808 may be automatically generated or custom defined by a user, for example, to allow the user to explicitly enter terms 802 in a hierarchy. In this case the dimensions 808 reference those terms 802 and have no sense 810. Dimensions 808 may also be generated by the user through a selection of senses 810 from an ontology 812, such as WordNet or the Library of Congress Classification System. In this case the dimensions 708 will reference the imported senses 810, which will then be available for manipulation by the user, who may want to rearrange senses 810 into some other hierarchy without altering the original ontology 812. A dimension builder interface is discussed in the Interactions section.

The terms 802 and senses 810 that populate the TRIST data store 306 are typically generated by incorporated tools/services, such as entity extraction or automatic categorisation. Terms 802 are also generated from the query expression that the user enters and from user specified dimensions 808. Sets of senses, terms and relationships in Knowledge Interchange Format (KIF) a language designed for use in the interchange of knowledge among disparate computer systems can also be imported by TRIST 200.

Visual Element Modules of the Tool 12

Figure 8:
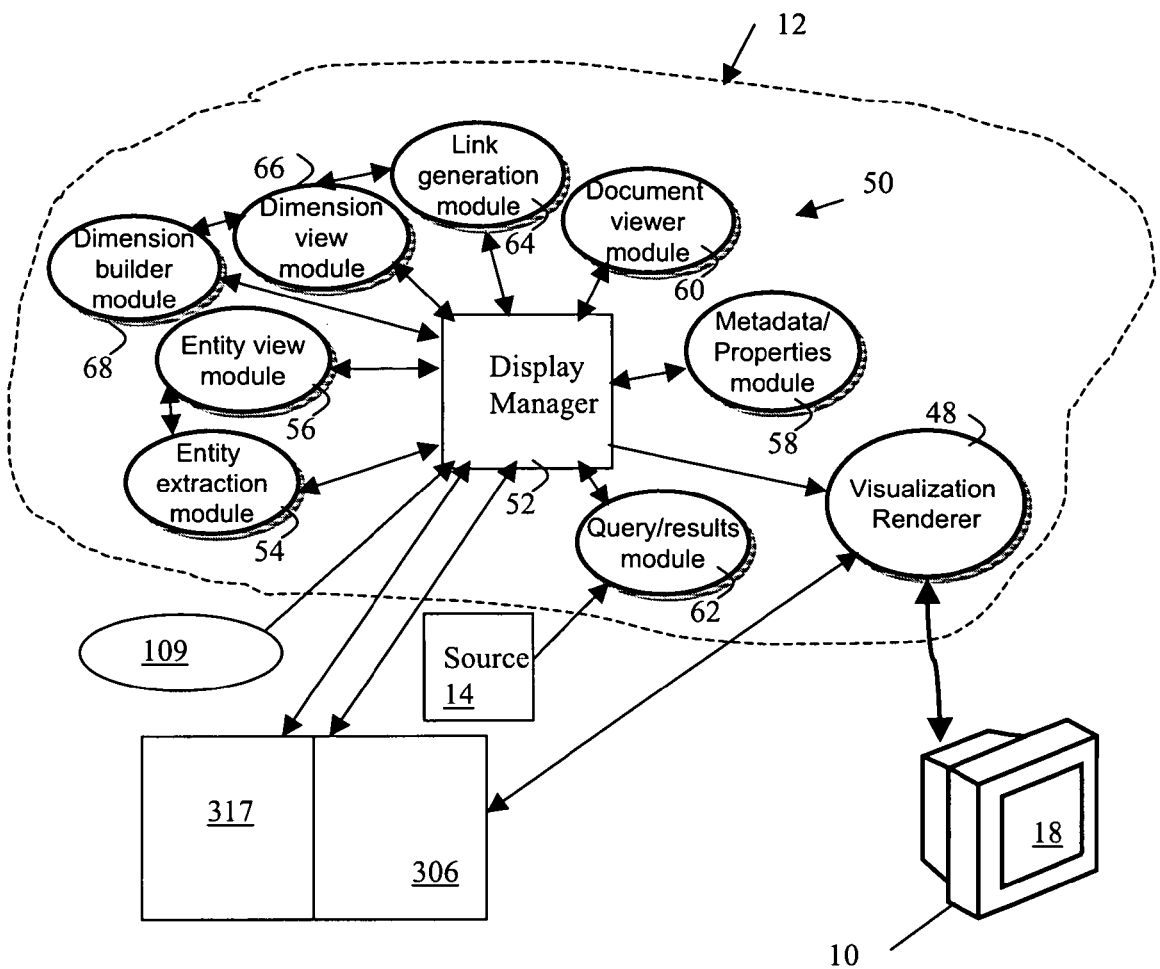
FIGS. 8 and 9 are each block diagrams showing visualization tool modules.
Figure 9:
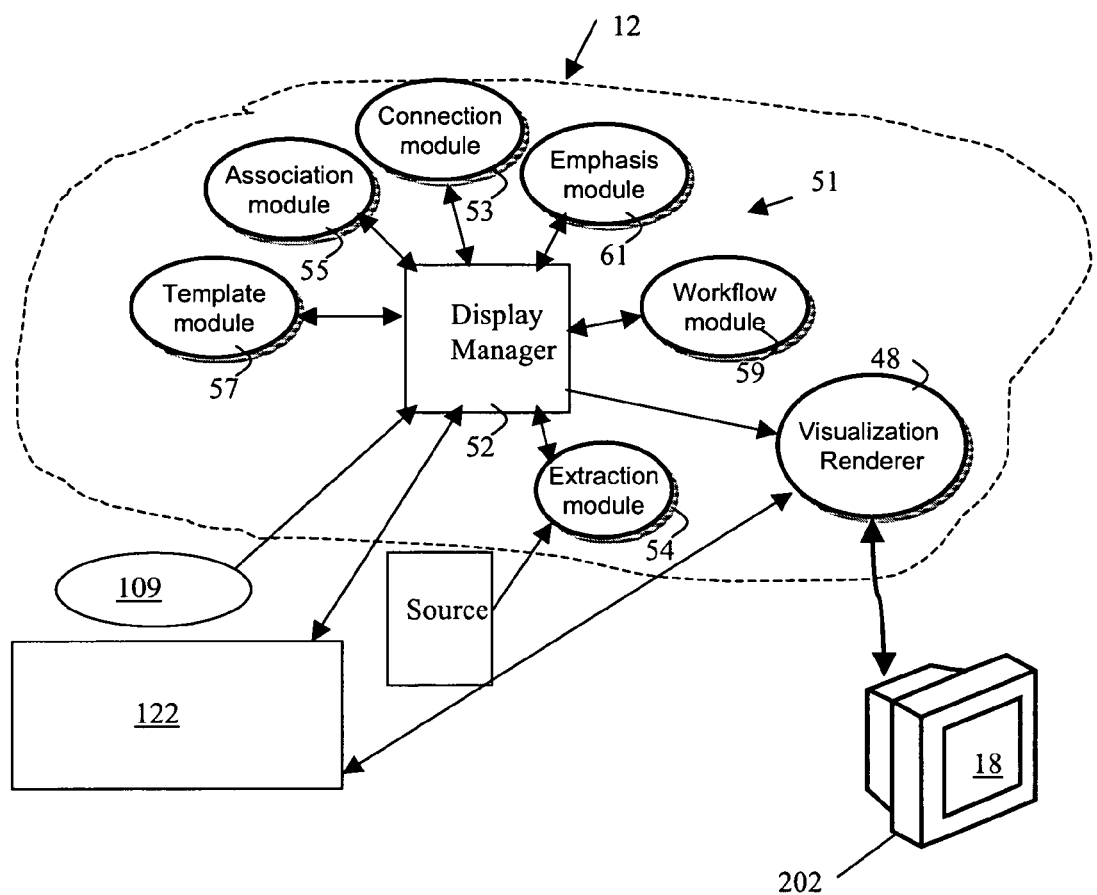

Referring to FIGS. 8 and 9, the tool 12 comprises a plurality of modules 50 and 51 (FIG. 9) for implementing the functionality of the TRIST component of the system 100, as visually presented to the user via the representation 18. A display manager 52 coordinates the interaction of associated modules 50 with the user inputs 109 for rendering in the renderer 48 and display 10 the representation 18 of the analytical content, and links to sources 14 and activity log and knowledge data store 306, 317 content to the Sandbox 202 portion of the representation 18. Tool 12 comprises an entity extraction module 54 for extracting entities from information sources 14 for display in the entity view 210, an entity viewer module 56 for organizing entity presentment in the entity view 20, a metadata (document properties) module 58 for assembling and displaying the dimension view definitions of the content of the respective document/Web page and properties view 212 (for assigning the document/Web page content to the predefined format of the dimension views), a document/Web page viewer module 60 for reviewing selected documents from the query results and/or dimension results views 208-209, a query and result module 62 for conducting queries/results and displaying such in the query view 204, a link generation module 64 for constructing or otherwise identifying and defining links 360 between items shown in the views, a dimension view module 66 for organizing and presenting the content of the dimension views 204-212, and a dimension builder 68 for constructing or otherwise defining the various user generated/amended dimensions.

The tool 12 also has a number of other modules 51 (FIG. 9) working with the display manager 52 for coordinating the interaction of associated modules with the user inputs 109 for rendering the representation 18 of the analytical content, links to sources 14, and the excerpts themselves to Sandbox area of the display 202. The tool 12 also has a connection/association module 53 for guiding or otherwise enabling the user of the tool 12 to input analytical content for simultaneous display (selected or otherwise) with the excerpts of Sandbox area—through user events 109, a template module 57 for providing a structured layout of the excerpts in Sandbox area, an association module 55 for binding two or more excerpts and their related analytical content, a workflow module 59 for coordinating a selected workflow of the tool user, and an emphasis module 61 for altering the display of the excerpt content and form.

Each TRIST view 204-212 generally corresponds to part of the solution of the analyst's task.

Query Views Module

Referring to FIGS. 2A-2C, in the query planning view 204A and 204B analysts are able to formulate, refine, organize and execute queries. Queries are listed in a tree structure that the user can reorganize. The structure can reflect the chronological order of multiple searches and their branching into sub-searches. The tree structure can also represent searches organized by topic and sub-topic. Visible query trails help with task decomposition and contribute to organizing the work product. This saves time during the report building and information retrieval phases.

Queries can also be easily discarded and recalled along with their historical result sets, available from a history tab 218 FIG. 2A or pane 204B. Favourite queries, for long standing assignments, can be browsed, selected and executed.

TRIST supports the ability to perform multiple concurrent searches. To help keep track of the running queries, the query planning view gives the user feedback to the state of the queries. The view indicates when a query has retrieved all the requested results and when it has pending results for the analyst to review (not shown).

Figure 10C:
Figure 10B:
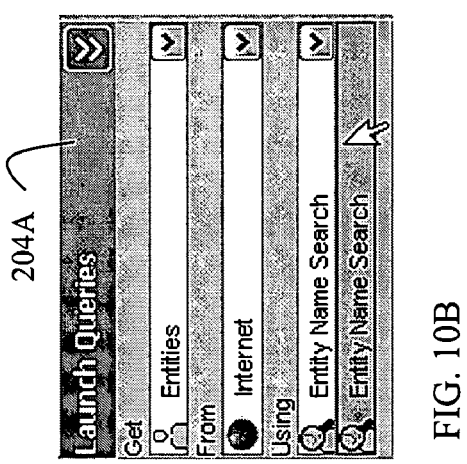
Figure 10A:
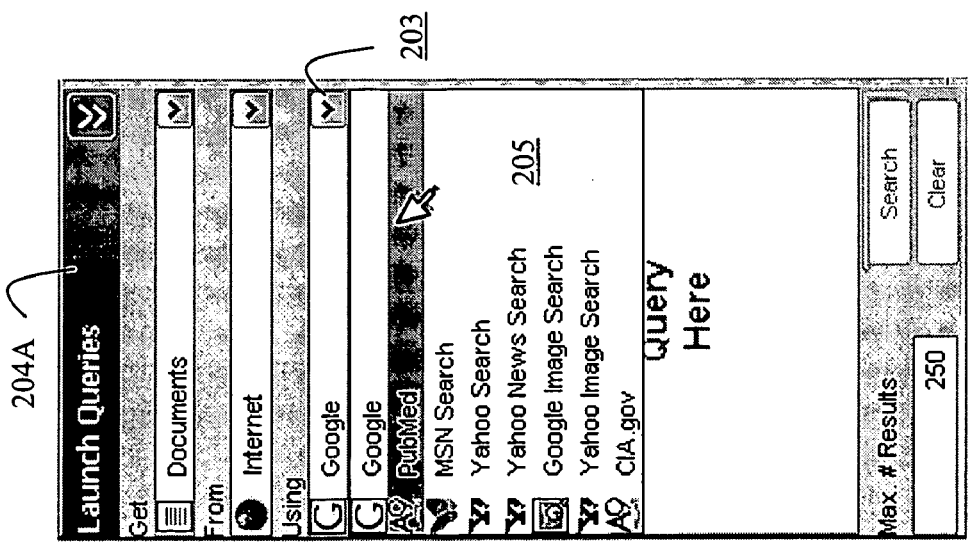

TRIST supports the ability to search against multiple search engines or information sources. Internet sources, document databases and local file systems can be searched. RSS (Really Simple Syndication), OpenSearch, with the industry standard XML interfaces as well as JDBC and ODBC interfaces are used to access multiple information sources and search engines. FIGS. 10A-10C are representative screen shots of launch query portion 204A respectively showing how a query may be defined to use various search engine and other search services 203 which can be invoked via interface 204A. A specific search engine or service may be selectable by a user via a drop down list 205. Advanced search options 203A may be defined when applicable interfaces are available from the selected search engine 203. To define a query, the type of result to get is specified (Documents (.html, .pdf, .doc, .ppt, etc.) or Entities (people, places, organizations, etc.). The data source to query is also specified such as the Internet or TRIST and Sandbox (all results in TRIST and anything in your Sandbox may be searched). The search engine or service 203 is selected and a query string input. The string may be input by typing, pasting or dragging and dropping (e.g. from a document browser 290 or entity view 210, etc. A maximum number of results to be retrieve may be specified and the query launched. FIG. 10B indicates that entity searches are performed via the Internet using the entity name search engine.

Once a query has returned results the analyst can refresh the dimension result views 208. This causes all the views 204-212 to be updated with the new results.

Figures 10D, 10E:
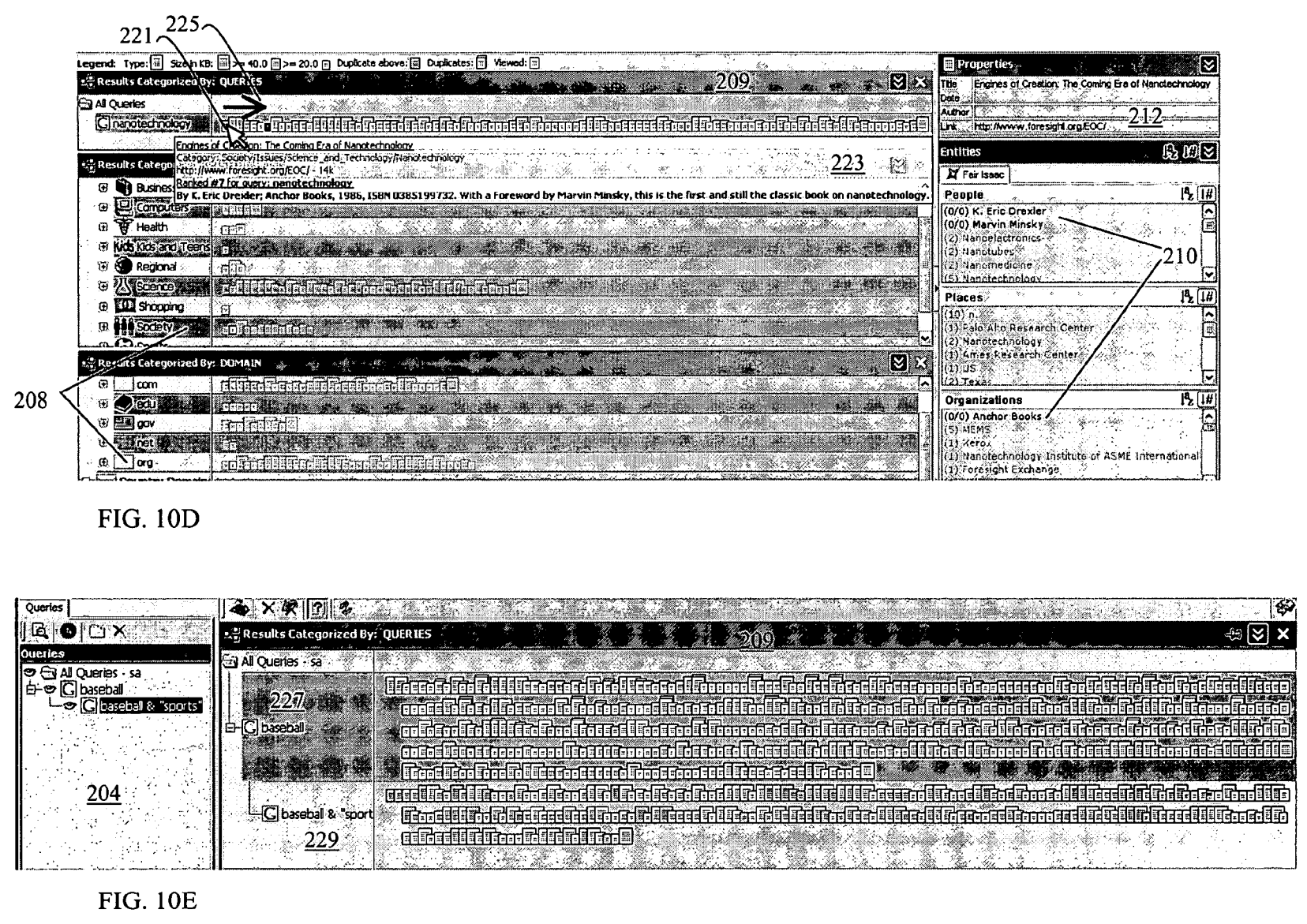

With reference to FIGS. 2A-2C, 10D-10E and 13 the query result view 209 lists the results (i.e. result set) for each query in a mirror of the tree structure of the queries. As will be described further in the next section, results are visually coded to indicate duplicates. This provides a fast and efficient way for the analysts to scan result sets and compare different queries side-by-side. Query result sets can be compared to quickly identify what is new or unread. The difference visualization counters change blindness inherent in viewing results out of this context. FIG. 10D shows a portion of TRIST 200 comprising query results pane 209, query dimension results panes 208 entity panes 210 and properties pane 212. TRIST 200 allows the user to quickly scan results in results pane 209. A document may be selected (e.g. by mouse 221). Tips interface 223 is automatically invoked, Using arrow keys, other documents may be selected (indicated generally by arrow 225). Document selection (i.e. changing from one to the next) automatically updates associated dimension views 208, entity views 210 and properties view 212.

Highlighting what is different is the first step to highlighting what is unusual. This immediate visual feedback of what is new and what is the same in a result set supports the iterative process of IR (Information Retrieval) by closing the feedback loop and improving the performance of query evolution Analysts can easily see the impact of changes to their query. Analysts do not have to read each document, or a summary of each document, in two result sets in order to understand the difference between two results sets. The same visual feedback can be used to compare the results returned by different search engines or other search technologies. The immediate visual feedback is a visualization of result set difference. This difference visualization is applicable to multiple concurrent result sets (i.e. more than two result sets).

The analyst may use result set difference visualization in a number of ways. For example, the analyst can repeat a query every morning and find what's new from previous days queries. Another example would be to execute the same search against different news services (e.g. to compare content between the BBC, Bloomberg News and CNN). Using the nSpace Protocol, TRIST can integrate and evaluating new search technologies. TRIST and the Sandbox provides side-by-side comparison of alternative technologies and an integrated workspace to perform evaluations in a whole workflow context.

FIG. 10E shows a portion of TRIST 200 comprising query planning pane 204 and results pane 209, Different queries 227, 229 can be compared in results view 209. White coloured documents in query result set 229 show which documents are not in query result set 227. A grey coloured document in query result set 229 is in query result set 227. The order of display of result sets 227 and 229 in query result view 209 can be changed by reordering the corresponding queries in query pane 204.

Note that the query planning view is divorced from the query tool (i.e. service or engine which executes a planned query and provides results). This allows query tools to be added and altered without disrupting the analyst's performance. This is also one way that TRIST can be used for analysis science to compare tools. Results for similar queries by different tools can be compared side by side to determine the strengths and weaknesses of the respective tools. These discoveries can be used to improve the tools and the way people use them; knowing the strengths of different tools the analyst can exploit them to improve the quality of the produced results. It should be noted that queries can be rerun (or reapplied) against updated information sources 14 or against other selected sources 14 and their respective query results compared.

Figure 13:
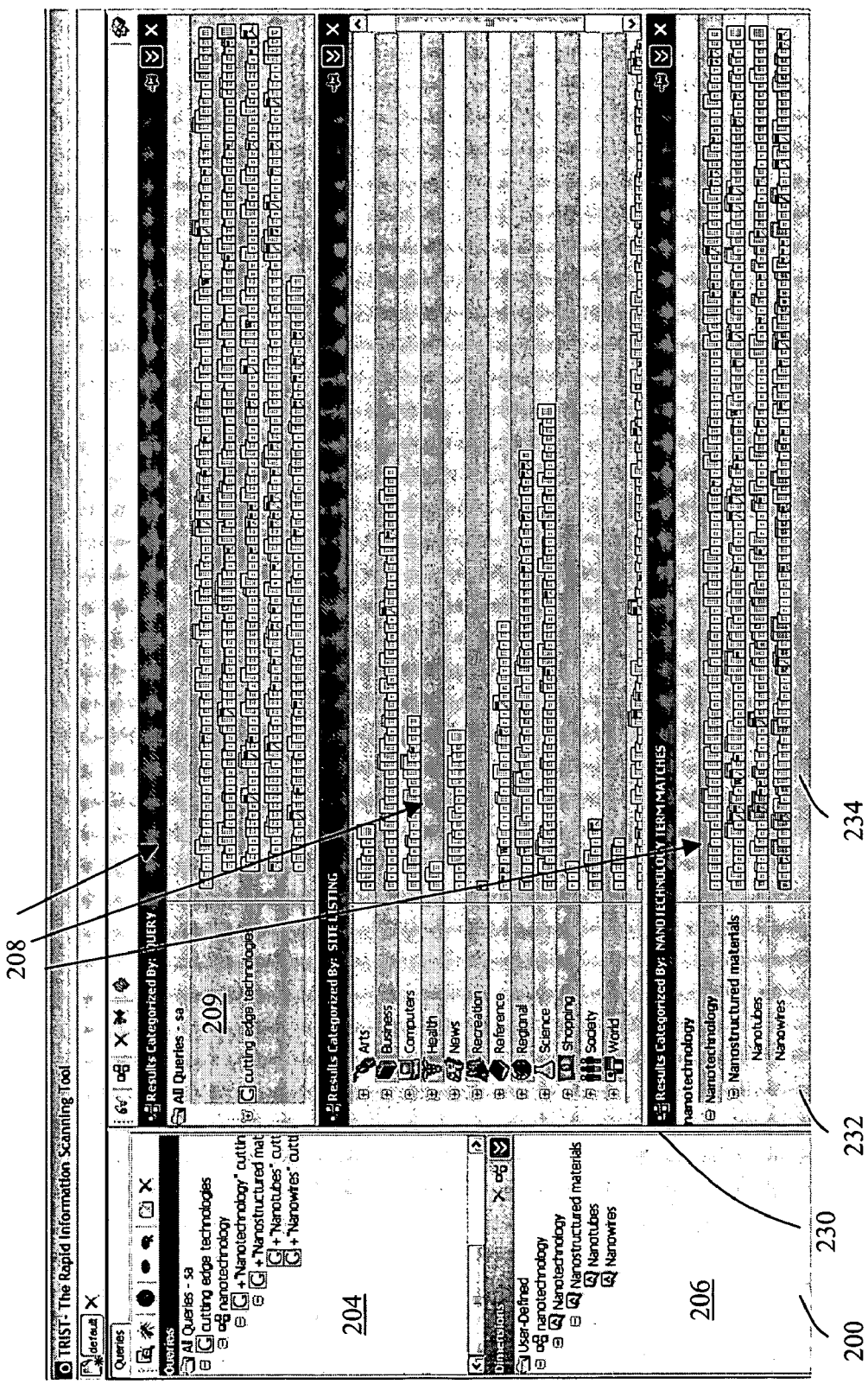
FIG. 13 is a representative view showing query results organised by dimensions where the same search result set is shown in each dimension.

Results views 209 support several functions to aid in scanning and in the identification of interesting documents see FIGS. 10D-10E, 13 etc. Features of the display of the results can be altered depending on the type of information the analysts is trying to isolate. The mapping from document size to one of the three icon sizes can be altered. The quantitative definitions of small, medium and large can be altered. In addition, instead of literal document size, the size of the icons can be mapped to another document metadata attribute such as date with larger documents being the most current.

Figure 19:
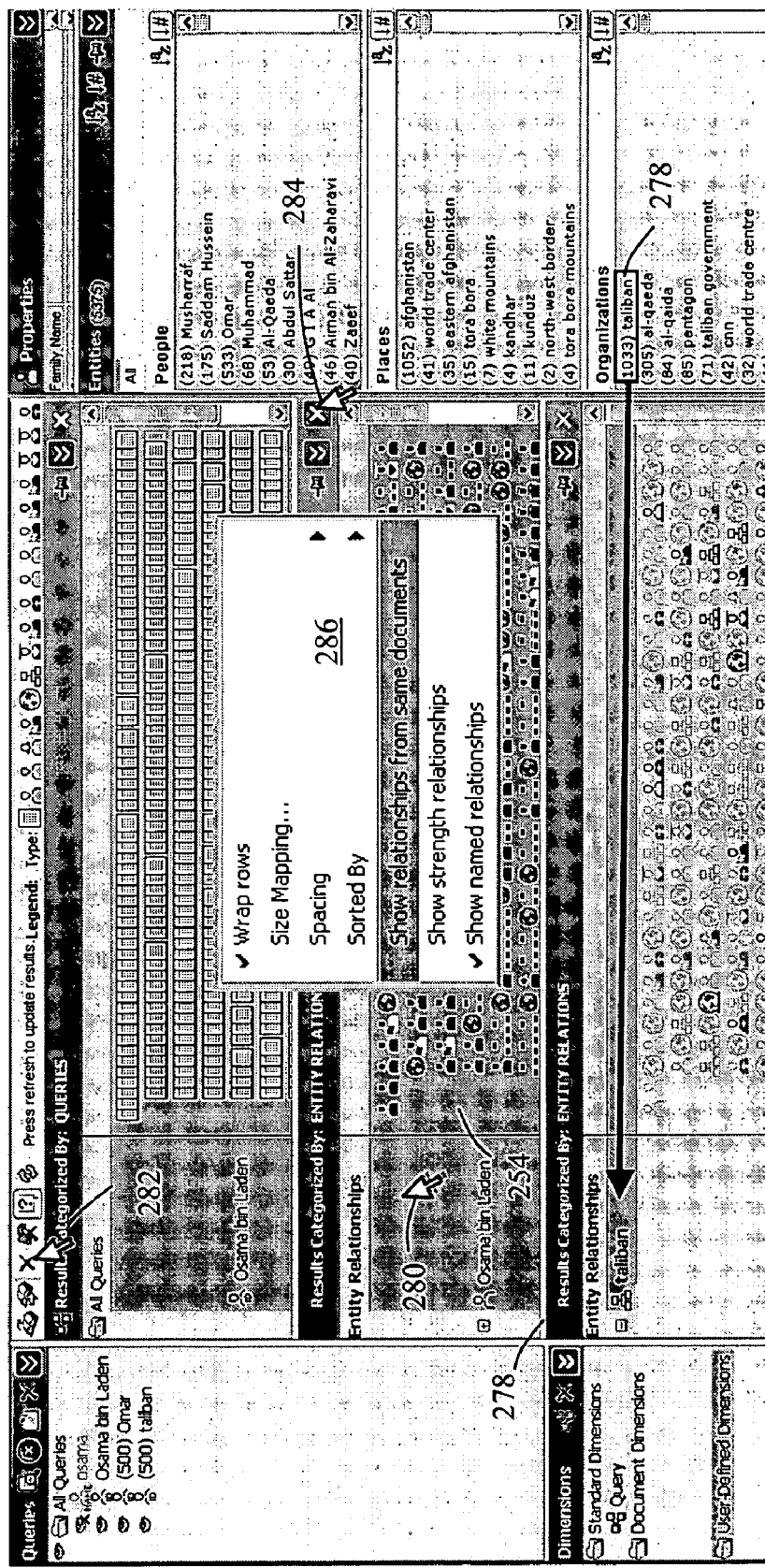

The results in the results view 209 can be sorted by the relevance ranking returned by the query tool, duplicate status, document size, or selection status. Sorting by selection status can make it easier to determine a rough percentage of occupancy that a selected subset makes up in some other category. For example, selecting an entire query you can see easily where most of the results lie in terms of directory listings in the directory listings dimension To aid in this kind of determination the analyst has options to change the spacing between result icons and turn row wrapping on or off (FIG. 19). This makes it possible to compare the lengths of different dimensions to get a sense of the results space. When a better comparison of relative percentage is desired the rows can be normalized to have the icon spacing fit the results to a single row the width of the result window. Analysts can use this capability for trend analysis. "Hot spots" and "indications" of trends can be detected across a broad spectrum of topic dimensions which can then be further investigated. By adding dimensions, for example, for time and for countries, trends are visible using the linked views to highlight, for example, amount of activity in diverse technology areas over time and/or by country.

The results views 209 also allow the analyst to annotate documents. Annotated documents appear with a yellow pin 217. The analyst can also hide categories and documents (e.g. hide all documents from sites categorized as "Shopping" in the open directory project web site classification dimension). When one or more documents are hidden they will disappear from their position in all the result views. Instead they preferably appear in a separate hidden category (not shown). In this way the analyst can remove documents from consideration, though with the opportunity to restore them if necessary. The hidden category can also be set to avoid displaying its aggregate results, instead showing a single line indicating the number of results it contains. Finally the results views (e.g. 209) support mouse over activated display of document information. Doing so will show the analysts a tool-tip-like hovering pane e.g. 223 that displays summary information on the document similar to the information shown in the document summary view that is populated when a document is selected. Similar pop-up panes 256 are available for entity information (see FIG. 17).

Dimension View and Building Modules

Dimensions are a property or aspect of documents related to the analysis or the search process. Examples of dimensions may include source of document, country discussed, topic discussed (e.g. technology type, business type, organization, etc.) date, metadata property (e.g. document size, open directory project web site classification, etc.), computed property (e.g. computational linguistic semantic cluster, extracted entities, etc.), and others. Dimensions have bins and documents are measured for their value in the dimension and then the document is placed in the corresponding bin in that dimension. Bins can be ordered in a list and/or hierarchically arranged. Dimensions and their associated "bins" can be selected from pre-defined dimensions or determined by the analyst. When selected, all the documents, or other information objects, in a result set are categorized into the dimension. Each dimension shows the same entire result set. Due to the compact visual representation of the result sets, multiple dimensions can be seen simultaneously. Seeing the same information in each dimension reveals different aspects of content or context of the information. Deeper insight into larger amounts of information is provided by seeing information from many perspectives all at once. Uninteresting results can be identified and ignored, and unusual observations can be isolated. Entity extraction results, e.g. people, places, organizations, are placed on the right and can also be considered a characterizing dimension.

Figure 11:
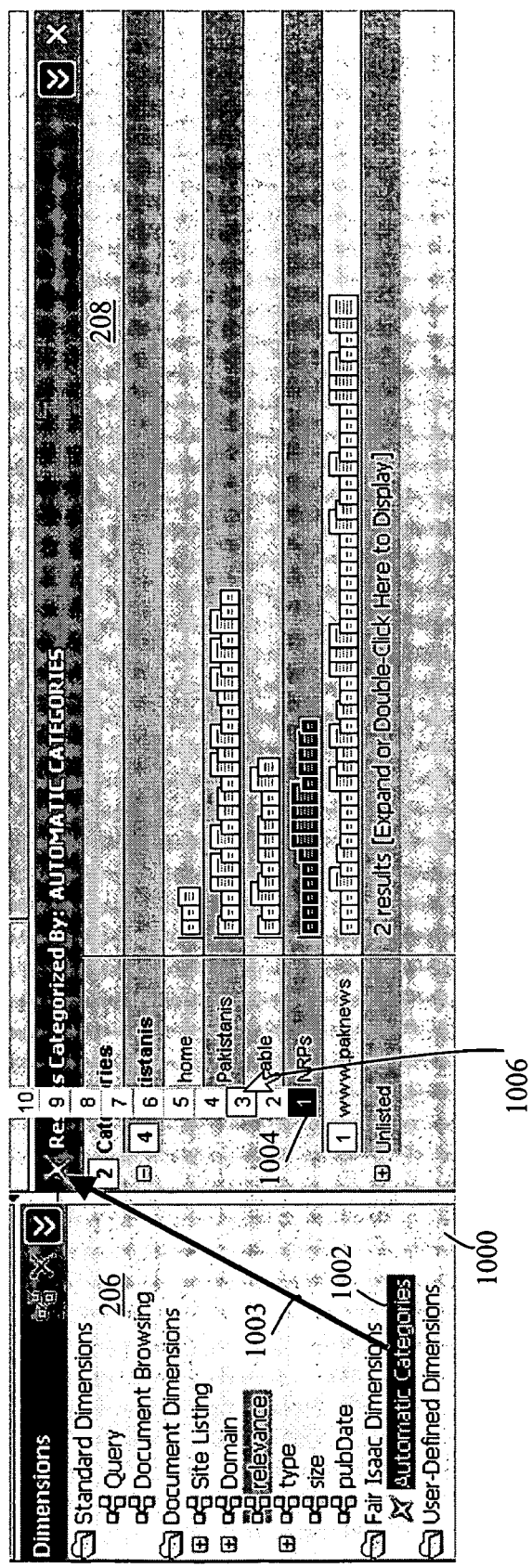
FIG. 11 is a representative view of the tool highlighting an automatic dimension definition feature for automatically generating categories for a result set.

The dimension view 206 displays trees of the analyst's custom dimensions. The dimension view 206 allows dimensions to be dragged into the query planning view 204A or the dimension results views area 208 (FIG. 11). In the former case a query is automatically augmented by the terms in the dimension. This means that new queries are created in a query group under the target query. Each of the new queries contains the original search criteria plus an additional term corresponding to a dimension node term. A new query is created for each node and the dimension's tree structure is copied amongst the sub-queries generated by the drop. In the latter case, when a dimension is dropped into the results area, a new dimension result view 208 is created with category nodes corresponding to the dimension nodes, again mimicking the same tree structure. This new view 208 is linked to the other dimension results views (e.g. 214, 215) in the usual way. Finally the dimension pane 206 will accept drops from text sources and from the entities view 210. In the former case new dimensions are created using each line of text as a term. In the latter case a new dimension is created for each entity dropped in to the view 206. This view may use a variety of methods to associate results with one or more category nodes. The exact set of methods used is determined by the user and can be changed at any time using the dimension's context menu.

Example methods for defining the dimension views and associating the documents, and other information objects, from the query results with the predefined format of the dimension views is shown. For example, the association methods for defining the dimensions and then filling with documents the respective bins of the dimensions according to the document contents (e.g. date, categories, terms, etc.) can be such as but not limited to: using metadata from the search engine or search database e.g. time, or relevance; using keyword Boolean searches to define dimensions (e.g. Google™ search engine); using the Library of Congress classification catalogue or other ontology to systematically define terms used for Boolean searches; using a clustering semantic analysis engine [e.g. Fair Isaac] that operates on "content" to mathematically compute meaning to gain an understanding of the document and return keywords (e.g. noun phrases and their relationships) to generate automatic categories; and using extracted entities and their associated links to other entities. All these association methods can be used to bin a body of documents previously identified by the results of a search.

FIG. 11 shows a portion 1000 of TRIST 200 showing an example representation of dimension pane 206 and results pane 208 and highlighting the automatic clustering categorisation feature. An automatic categories dimension 1002 may be produced when a computational linguistic clustering service is integrated to review a result set and determine semantically topics to categorize the set. When the dimension is open (denoted by arrow 1003) to the results pane 208, all the results from active queries are grouped into the number of clusters (or less) specified in the top left corner of the automatic category dimension (e.g. 1004). The level of clustering can be modified in an iterative fashion by clicking on the number to the left of a cluster and changing the number of clusters requested.

Document clustering, using a context vector method from Fair Isaac [Caid, 1997], is an example of a computed dimension. Document similarity is scored and the document is assigned to the nearest cluster if it scores at least the threshold for that cluster. With unsupervised clustering (UC), results dragged into that dimension are clustered automatically on the fly and categories representative of the clusters are created. No prior knowledge of categories is necessary. The analyst can reclassify all or a subset of the results on the fly, building quick understanding of content by chunking it in many different ways. Unusual results or specific results can be isolated. Lightly supervised clustering, trained with keywords and sample documents, can also be integrated within the TRIST multi-dimensional framework.

Figure 12A:
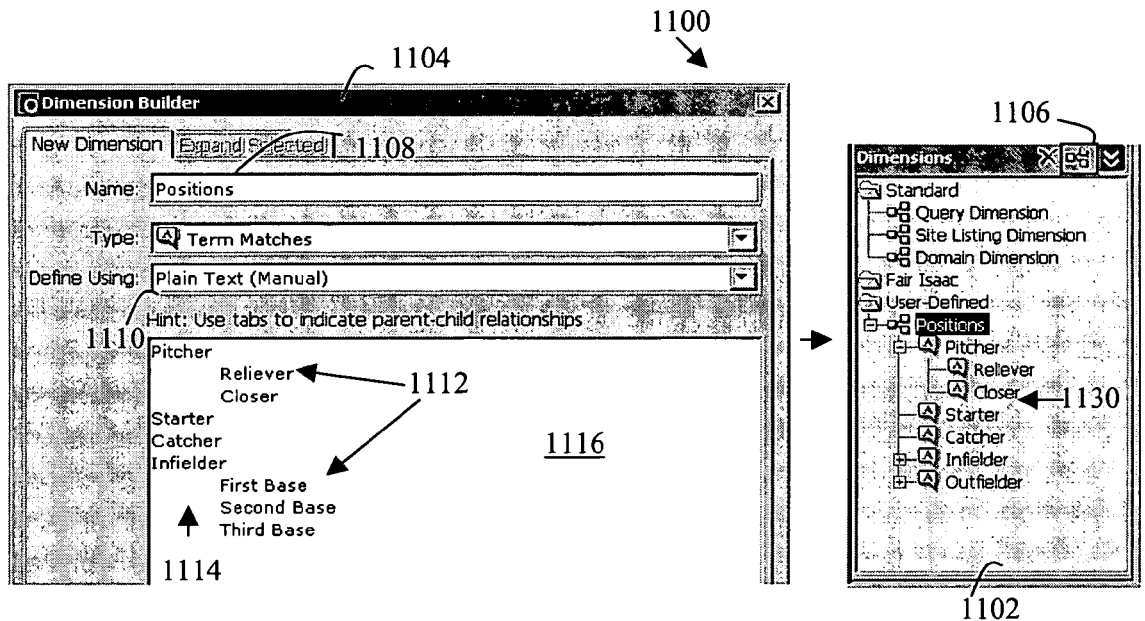
FIGS. 12A and 12B are representative views of a dimension builder in accordance with an embodiment of the visualization tool showing a user defined dimension and selected entries under the Library of Congress term baseball.
Figure 12B:
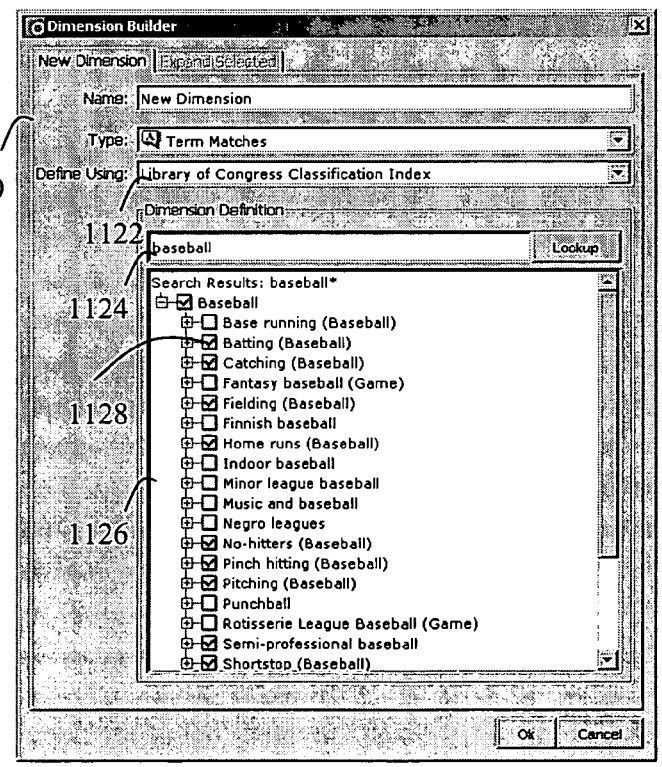

FIG. 12A shows an example of a dimension definition representation 1100 namely a dimension view 1102 (similar to dimension view 206) and a dimension builder dialog interface 1104 which may be overlaid on one or more TRIST views 204-212 and configured to create a user-defined dimension. A user may click a new/expand dimension icon 1106 of view 1102 to initiate a dimension builder dialog interface. To define the dimension, a name 1108 is supplied and the selection "plain text (manual)" made as the basis facilitate a user-defined dimension. Elements of the dimension including terms to define the bins (e.g. 1112) and hierarchy (indicated visually with tabs (e.g. 1114) are entered by the user in an editor portion 1116 of the dialog 1104. FIG. 12B shows a dimension builder dialog interface 1120 similar to dialog 1104 but configured to create a dimension using the Library of Congress Classification Index available via a Web service interface as previously described. A term to expand into a definition is entered in a lookup interface 1124 and a lookup is performed via the Web service. Lookup results are returned for display in a lookup results interface 1126. Terms of interest may be selected for the dimension (e.g. 1128). A dimension (e.g. 1130) may be used to define a new ontological query. TRIST 200 supports drag and drop interaction well known to persons of ordinary skill in the art By dragging the dimension representation from the dimension view (e.g. 206 of FIG. 2A) to the query view 204, an ontological query may be defined. An existing query may be refined by dropping the dimension on the representation of the query in the query view.

As described with reference to FIGS. 12A and 12B, from the dimension view the analyst can create new dimensions. The dimension building dialog allows the analyst a variety of sources to draw upon while creating new dimensions. The simplest is text entry, with lines and indentation indicating the tree structure that should be generated. Currently the analyst can also choose terms from the Library of Congress Classification System. Starting with a search term TRIST 200 finds Library of Congress terms. The terms are optionally expanded; returning sub-terms. The progression through the classification system is entirely guided by the analyst. Terms of interest are selected by the analyst for inclusion in the bins of the dimension that will be built.

The dimension building dialog treats the Library of Congress, for example, as an ontology, pieces of which the analyst finds useful and retrieves to the TRIST 200 workspace to enhance the query generation and multidimensional result exploration. Like other aspects of TRIST 200, the dimension builder is modular. Any ontology can be loaded into the system and browsed by the analyst. By selecting pertinent parts, the analyst can create a custom ontology for use in the task. Furthermore, within the dimension view dimension nodes can be reorganized, in his way a custom ontology may have its origins is several systems.

Advantageously, the dimension builder in TRIST 200 provides a generic ontology browser; allows unconventional sources, such as the Library of Congress Classification System, to be used as an ontology; and allows the creation of new ontologies from a synthesis of existing ones.

Multi-Dimensional Result View Module

The query result view 209 works in parallel with the other dimension result views 208 and visually functions the same way. The query results (associated documents, links, web pages, etc.) are visualised in pane 209 according to query terms/structure. Query results are visualised in dimension views 208 according to dimensions (categorizations) in view 206. Such dimensions may be default dimensions predefined for TRIST, automatically defined dimensions (e.g. by clustering services) or user-defined, including those assisted by external ontology sources (see FIG. 13). Each dimension result view (e.g. 230) contains a tree structure of dimension nodes 232 or categories on the left and the query result contents 234 contained in these categories on the right. When dimensions are hierarchical, nodes can be expanded or collapsed to show or hide, respectively, sub-categories. When a node is collapsed the results from that category and all sub-categories are aggregated into a single result row.

The dimension result views 208 provides multi-dimensional result characterization that allows for an extremely fast, user controlled parallel processing of metadata. In a similar manner to the side-by-side comparison of results among queries in the query result view (query summary), the other dimension result views (expanded query result contents) can highlight important differences and similarities between categories. Relationships in the results can be seen in context. The default dimensions (e.g. site listing domain) allow analysts to quickly ascertain rough credibility by identifying sources known to be less reliable; and to find relevant results that appear in useful categories. Through custom dimensions, analysts can define layouts to reflect thought process and assumptions. This functionality can also be used to isolate unusual results or specific results. Multiple dimensions of the problem are displayed and connected through common data objects (e.g. links 360) simultaneously.

TABLE 2

| | Sample icon decorations and their meaning |
|---|---|
| | Document file size |
| | Document file type |
| | Duplicate documents (in separate queries and in a single query) |
| | Selection states (Normal selection, duplicate document selected from another result, not selected in another view, document brushed in this or another result) |
| | Previously opened document |
| | Document with annotation |

To enrich the result comparison process, a vocabulary of meta-data driven icon decorations or other visual emphasis showing inter/intra document connectivity indicates to the tool user key pieces of information about the result documents. Some of these decorations are summarized in Table 2. These decorations can allow the rapid, parallel scanning of results to yield greater amounts of information in less time. The parallel display of results simultaneously across multiple dimensions allows the analyst to see connections and intersections (links 360) among documents returned from many queries. Especially combined with the dynamic highlighting functionality of linked selection, the analyst can quickly see trends and exceptions in, for example dimensions, country, time, institution and people. The analysis of results across dimensions is far more efficient and rapid than conventional text result scanning.

The display of results in the dimension result views 208 allow the analyst to assimilate and interpret an image of the result sets using the visual processing power of the human brain, as opposed to textual lists of results. This lets the analyst rapidly scan across the linked interactive panes (views 204-212) with less effort and in less time than it would take to read textual representations. Much more information can be reviewed with less fatigue. The relentless reading document after document, list after list, experience can be avoided. The result is that an analyst can quickly and correctly identify which documents, in result sets of hundreds, contain relevant or useful information before having to personally open and read them.

It should be noted that each multidimensional view 213-215 contains the same set of objects (documents, web pages, etc.). The dimension views are linked so that when one or more documents e.g. 216 are selected in one dimension view e.g. 214, the same documents are selected (i.e. visually emphasized) in all the other dimensional views 213 and 215 (see too FIGS. 2A-2C and 10D).

Entities View Module

Referring to FIGS. 2A-2C, in order to help produce meaning from the documents retrieved by the analyst's queries, TRIST employs an entity extraction module (54, FIG. 9), accessed using the nSpace Protocol, to identify potentially salient mentions of entities. Entities are organized and listed in the entities view (e.g. 800 FIG. 7) sorted by number of occurrences (see 210 of FIG. 2A). The TRIST representation provides the user with information about the entities along with their listing. Entities that are also search terms (of the query view) are highlighted/emphasized in blue (for example), and the number of occurrences in documents/web pages of the dimension views is given in parentheses. When one or more documents are selected in a dimension results view 208, each term in the list that does not appear in the documents is replaced by a bar whose length corresponds to the number of occurrences. This gives a focus-plus-context histogram view of the entities. The focus is comprised of the entities that appear in the document. These are shown in the context of the entity list with their position indicating their overall number of occurrences. In this case the occurrence count in the selected documents is also given, next to the total occurrence count. The bar view also retains the entity highlighting.

Like the query planning view 204, the entities view 210 is independent of the underlying extraction module (e.g. server 315) used to generate the entities. Entities extracted and organized by different service modules (in part or separate from the tool 12) can be displayed as separate tabs in the same entity view 209, as side by side lists, or combined in a single master list. In this way the effectiveness of extraction of different extraction modules can be coordinated by the entity viewer module and compared and the respective strengths of each service approach can be exploited by the analyst.

Figure 14:
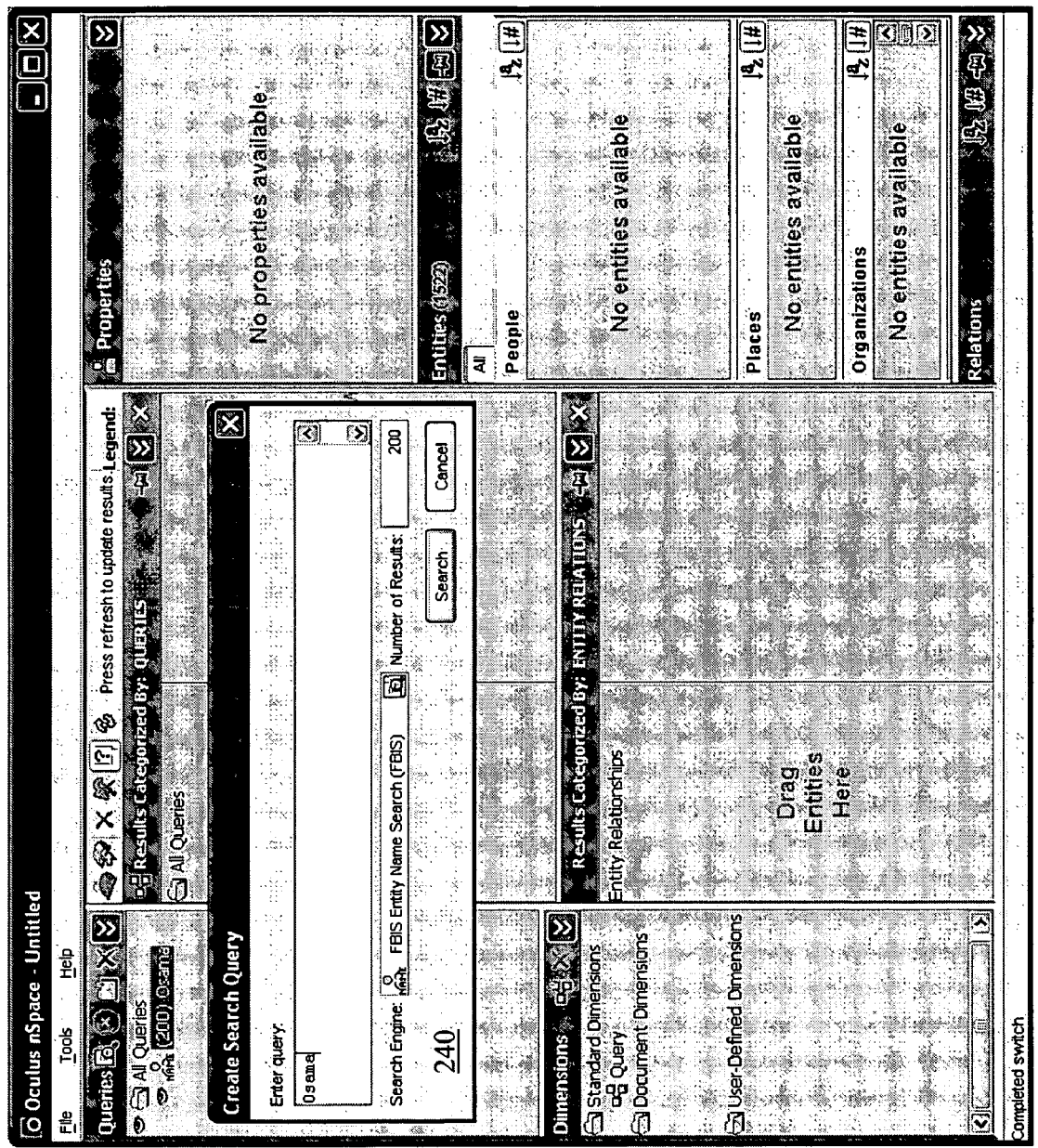
FIGS. 14-19 are representative views highlighting entity queries and entity relations exploration.
Figure 15:
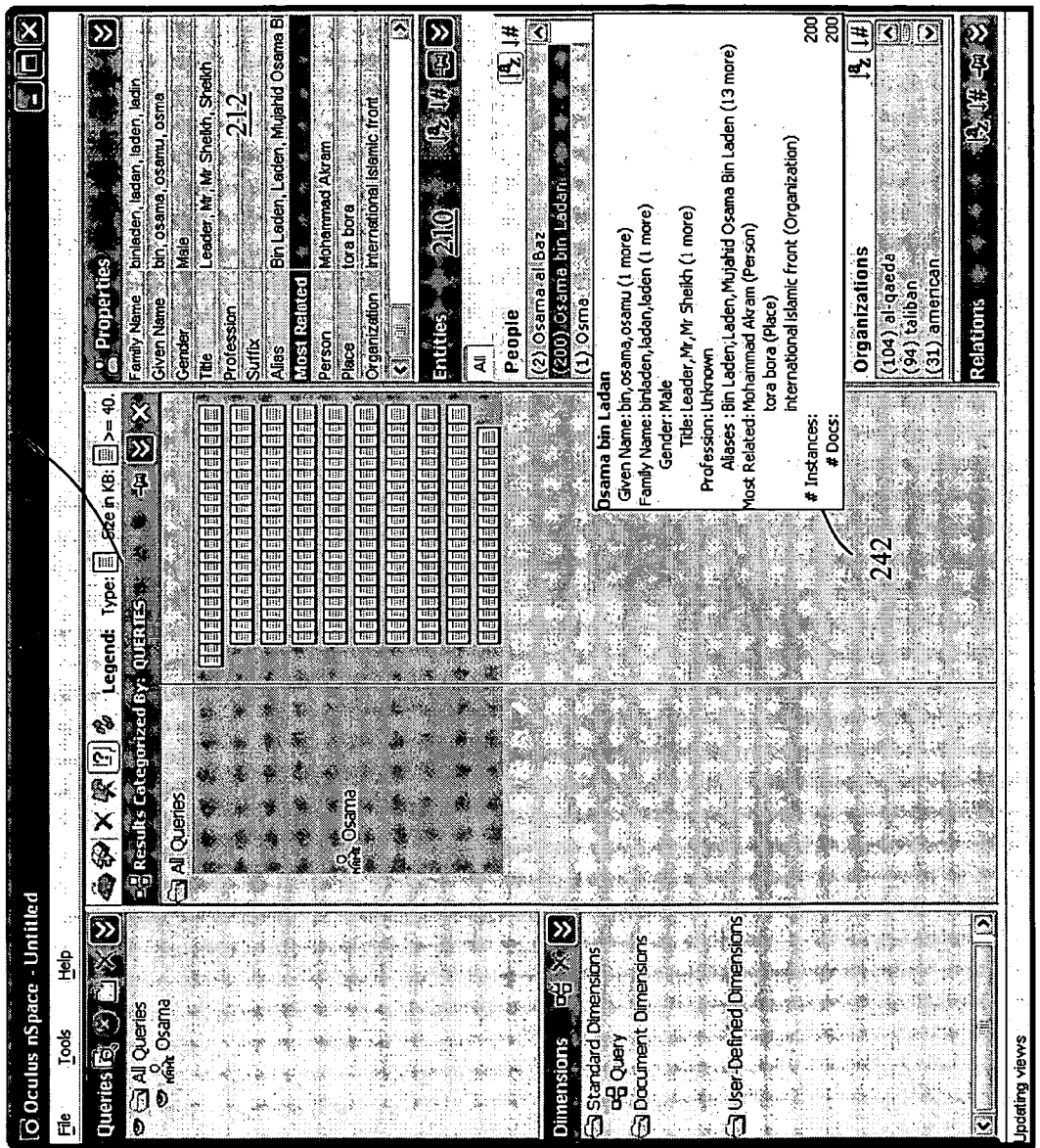

FIGS. 14 and 15 are representative screen shots of TRIST 200 comprising an interface for performing an entity name search and visualization of search results. A search query dialog interface 240 facilitates entry of search terms, search result set size and search tool (service) selection. Search results and extracted information are distributed to the linked views of TRIST 200, namely query results view 209, entity view 210 and properties or metadata view 212. The entity view 210 shows extracted entities (people, organizations and places, for example) from the query results which may be sorted alphabetically. A user may navigate the entity view (e.g. by scrolling or mousing). Multiple entities with the same name may be extracted by the entity module 54 (FIG. 8). Selecting or mousing over an individual entity object representation 242 will reveal attributes for the entity including title and most closely related entities. Documents in the query results view 209 mentioning the selected entity are highlighted.

Figure 16:
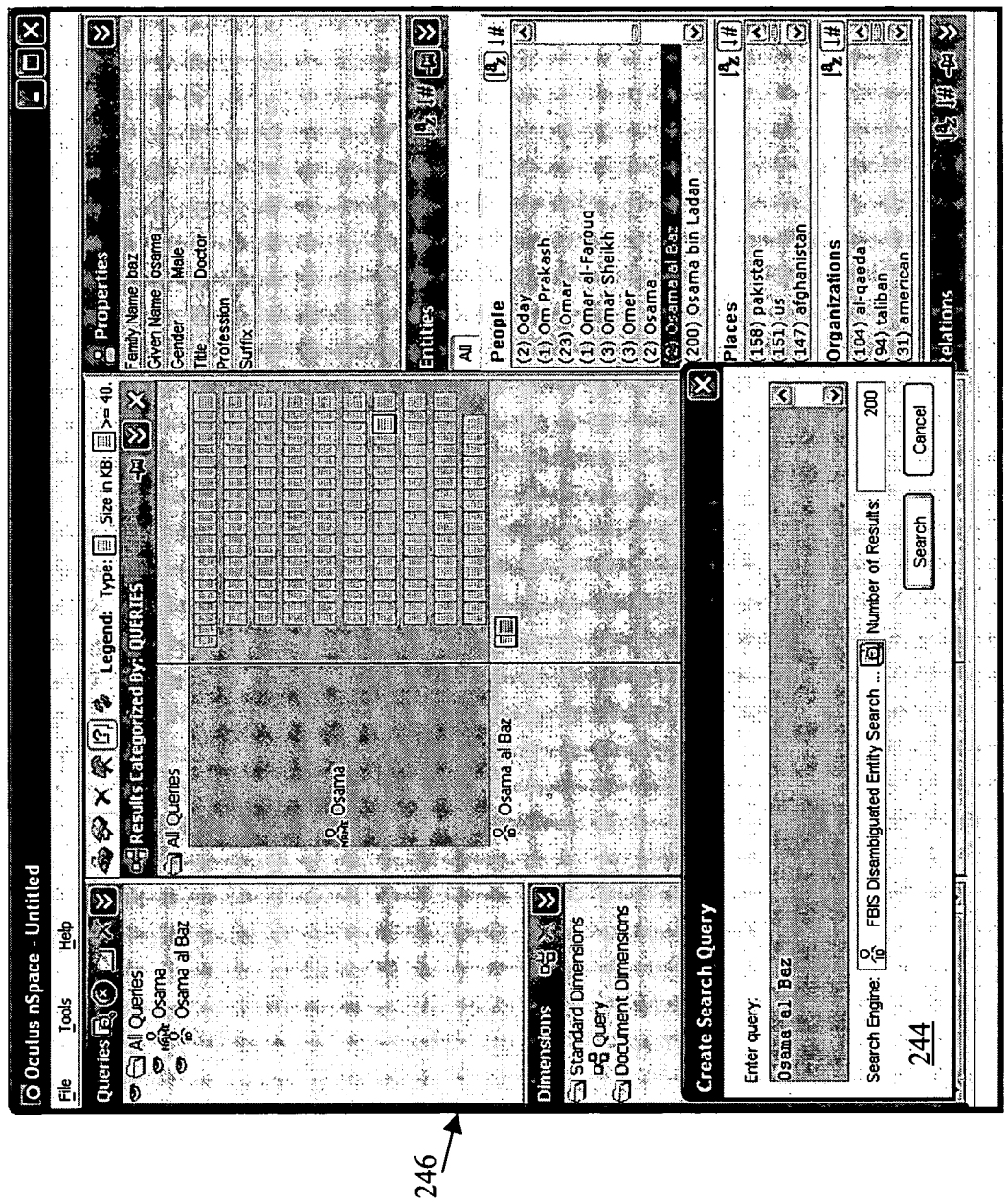

Entity disambiguation searches may also be performed. With this type of service, documents are found that refer to the same entity, even in the presence of spelling variations and multiple different entities with identical names. Entity relationships with other entities are identified by type of relationship (e.g. family, work) using computational linguistics. Relationships are arranged in a hierarchy of types by the service. FIG. 16 illustrates such a search query 244 and resulting TRIST representation 246. An entity may be selected from the entity view 210 and drag and dropped into the query view 204 to initiate a query dialog 244. The disambiguation search service is selected so that only documents that mention that entity are retriever. Advantageously as a result of link selection, prior query results remain shown in the query results view 209 but are visually distinguished (grey/fade out). Selecting yet another entity (e.g. an individual entity object) invokes a highlighting of only those documents in which the searched entity and selected entity are located in view 209 (not shown).

Figure 17:
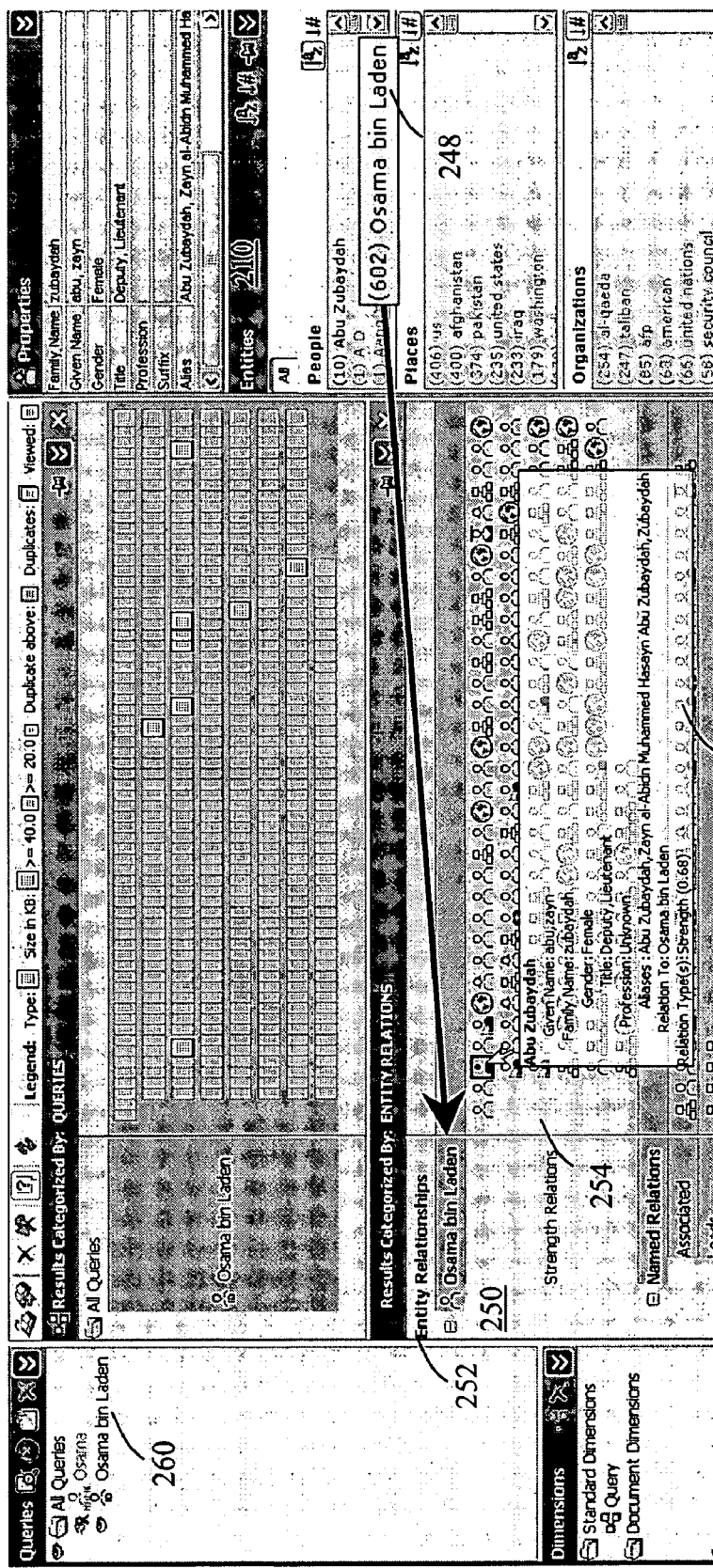
Figure 18:
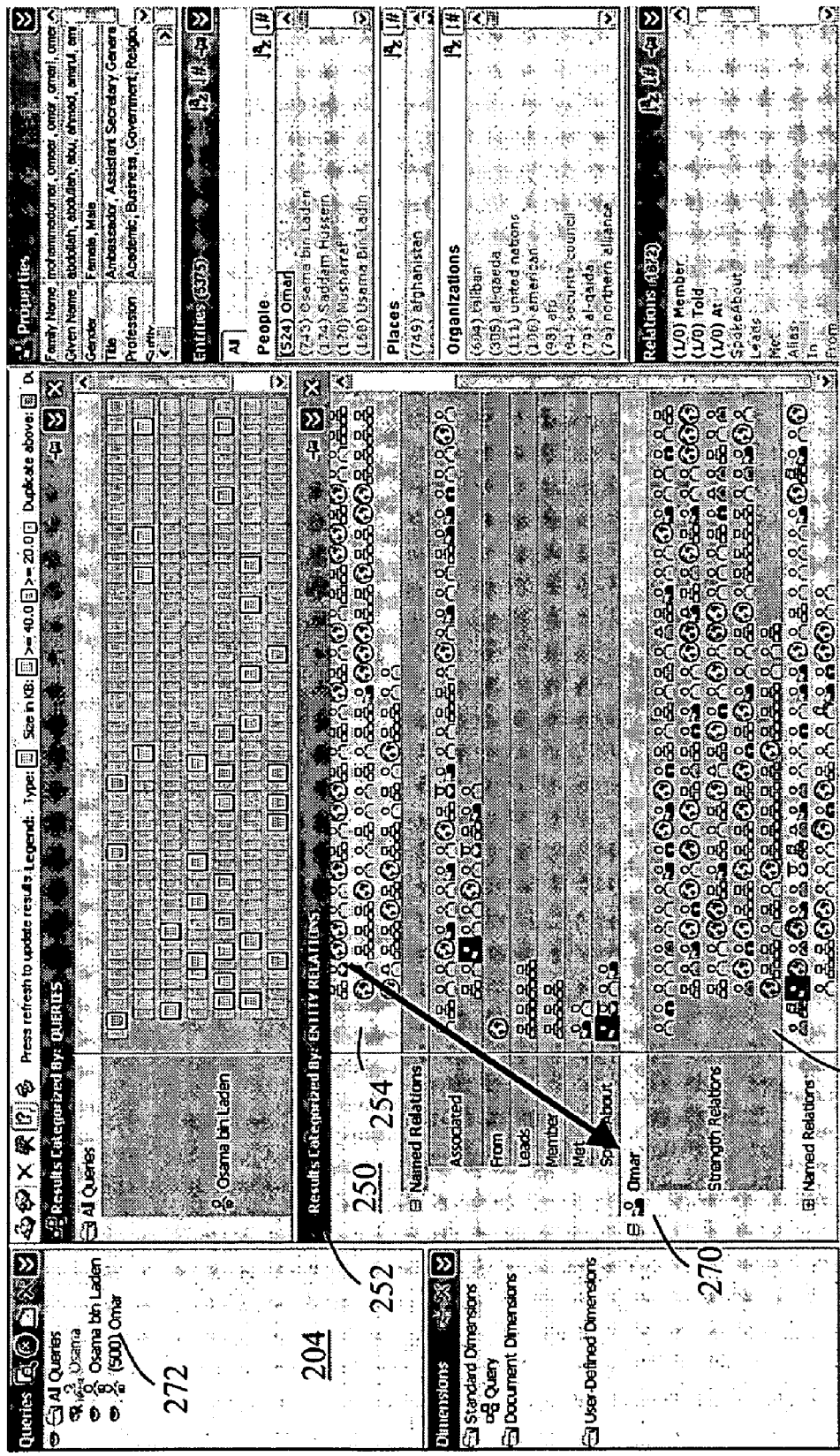

FIGS. 17 and 18 illustrate entity relation exploring features by way of example screenshots of portions of TRIST 200. To explore entity relationships and find an entity's relations, a user may double-click on the entity relations dimension 252 in view 208 or drag the dimension into the results view (dragging not shown). A particular entity 248 of interest may be dragged into the left side 250 of the entity relations dimension as indicated by the arrow. Dropping in an entity may launch a new disambiguated entity search (e.g. 244 (FIG. 16)) to obtain more named relationships as described above. In this case, a new query 260 is displayed in query planning view 204 and results view 209. Within the entity dimensions view 254 of these search results, the first row shows entities that are strongly related to the entity of interest as determined by the disambiguated entity search. As information for the entities is obtained from the search and data objects populated by the tool (e.g. by modules 50 (FIG. 8)), attributes about the related entities may be visualized. A user may scan the strongly related entities, moving a cursor or focus over the entities such as by using arrow keys of a keyboard device or mousing to invoke additional displays for a relation (e.g. 256) detailing information provided by the disambiguation search. Some individual entity relations determined by the disambiguation search may not be linked to the initial (i.e. current) result set and have no results highlighted in the results view 209. Entity relations may be determined from additional documents of the disambiguation search service. Recursive relations of relations can be determined and examined.

FIG. 18 illustrates by way of an example how TRIST may assist a user to obtain further entity relationship information including finding relations of relations. To get more search results for a strongly related entity (i.e. by way of a name search 240 described with reference to FIG. 14), the entity object may be dragged it into the query pane 204 (not shown). To determine more about an associated entity 270 to the entity of interest 248, the associated entity visualized in view 254 may be dragged to the left side 250 of the entity dimension view 252. As described with reference to FIG. 17, a new disambiguated entity search 272 is defined and displayed and the results visualized 274 for the additional entity.

Manipulating the entity relations dimension permits visualization of different entity relationships. FIG. 19 shows by way of example a second entity relations dimension view 276 for a second entity of interest 278 which may be invoked as described with reference to FIG. 17. To delete a row from the entity dimension view (e.g. 254) a user may click in the left cell of that row 280 to select everything in the row (and everything under the row if the rows beneath are collapsed) and then click the X 282 in the top toolbar. To close an entity relations dimension (e.g. 252), a user clicks the X 284 in the upper right corner of the dimension's header. Right-clicking in the results pane (e.g. 254) invokes a display options interface 286 for toggling the visibility of each type of relationship among other display properties.

Selecting two entities in entity view 210 permits a user to visualize relationships in the search results (documents, entities and relations). For example, highlighting by use of color change, etc. may show all documents, entities and relations linked to either entity selection (union) by fading out those outside the union and all documents, entities and relations linked to both selections (intersection) are highlighted in a contrasting color (see Table 1).

Microsoft's IE™ browser for viewing text, html, Adobe Acrobat™, Word™ documents, etc.). Selecting a document in the results view 209 and pressing enter or double clicking invokes a document browsing dimension 290. Once the dimension is open, scanning documents with the arrow keys or single-clicking on them will automatically open the document in the browsing dimension 290

The viewer is enhanced with a number of integrated features. When viewing a document, to facilitate scanning its contents, an entity markup feature may be a default option whereby selected extracted entities are automatically highlighted 292 (where possible). Query terms 294 which originated the document are also highlighted (where possible) for example by marking in a distinguishing colour. Selecting an entity 292 in the entity view 210 will show a marker e.g. 296 in the scroll bar indicating where the entity is found in the document. More than one entity may be selected (e.g. using Ctrl+click). Text or other selectable objects in a document may be selected and copied, particularly to the Sandbox 202. A document's relevance may be set (e.g. by choosing a rating (not shown)) by the user and a relevance dimension defined using the ratings to sort the results.

FIG. 20B illustrates the query results view 209 for a sample data set showing how documents previously opened in the document viewer 299 (encircled for emphasis only) are visualized in a different colour (e.g. yellow). Through a visual-based emphasis, the analyst can scan to provocative sections more easily. Furthermore, the document ruler alongside the document shows line positions of all highlights over the whole document. The markings act as hyperlinks to the relevant section of the document. This speeds navigation to relevant parts of the document and also gives the analyst a sense of how many terms there are and how dense they are in the document.

While in the viewer, all other dimensions are still visible, allowing the document to be perused in context.

TABLE 3

Entity Coding in Display Icons

Gender encoded in head

Unknown   Male   Female

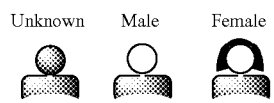

Profession encoded in clothing

Unknown   Government   Business   Military   Academic   Religious

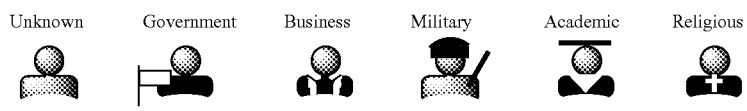

Table 3 shows various entity icons and how attributes (e.g. gender or profession) may be encoded in the icons for quicker visual recognition.

Document Viewer Module

FIG. 20A illustrates TRIST 200 comprising an integrated document viewer or browser 290. Document viewer 290 may be configured to appear in place of a dimension results view 208 (see too FIG. 2B) or as a separate window panel. The tool 12 includes a document viewer module 60 for viewing search results, preferably in various formats that may be searched (for example, the viewer may be a known tool such as Other View Modules The analyst's task is aided by several other views. The document summary view 223 (FIG. 10D) may supplement the properties view 212 to provide information about the currently selected document: title, creation date, author, and source URL as well as a snippet showing the context of some of the found search terms. This offers the analyst a finer level of detail regarding the results that can be consulted before opening the documents in the integrated document viewer. The summary view appears in a floating slightly transparent panel. When the analyst is using the keyboard arrow keys → or ← to advance to the next document selected, the summary view is updated with that document's information.

The overall dimension view 206 is a collapsible view where the analyst can specify custom dimensions. The dimensions are displayed in tree structures and icon decorations (visual based emphasis) indicate the source of the dimension nodes (see FIG. 15). From this view dimensions can be reorganized and drag and drop functionality lets the user generate queries based on dimensions and create dimension result views.

The nSpace Protocol defines a standard, open XML interface and messages for exchanging data among information resources, objects and processes. A flexible communication architecture works with Web Services, Peer to Peer and Client/Server systems. Local and remote knowledge and agent resources are accessed through an open extensible messaging standard. The protocol allows different resources to be "plugged-in" as required for customization of a set of components as shown in FIG. 1. The nSpace Protocol enables nSpace to be a system of systems, performing in combination with third party computational linguistics resource services 15, entity extraction, disambiguated entity extraction, document semantic clustering algorithms, reasoning, hypothesis generation, text-to-concept map algorithms and information retrieval technologies.

The Protocol is extensible. It defines a framework for adding new kinds of messages that can be plugged into existing communications. Heartbeats are special messages designed to provide insight into the system state for a user. Each back-end service publishes Heartbeat messages regularly (e.g. every 10 or 30 seconds). nSpace (or other user-visible applications) subscribes to those Heartbeat messages and can display the status of underlying services to the user at a glance.

The Protocol message format includes three sections: Properties (version information and message header data), References (the list of resources that are pertinent to the message: documents, entities and relationships (and their data)) and Elements (message-specific data, normally referring to resources in the references section). Message validation uses Namespaces and XML schemas. Resources and elements in messages use unique resource identifiers (URI). Messages in the nSpace Protocol use a variety of transports: Web Services (XML exchanged through POST and GET), Publish/Subscribe (XML exchanged through a message server (e.g. XML Blaster or Glass Box) or peer-to-peer network (e.g. TIBCO or Scribe)) and Drag And Drop (XML exchanged through standard Windows and Java Drag-and-Drop).

Integrated Sandbox Workspace

Figures 21A, 21B:
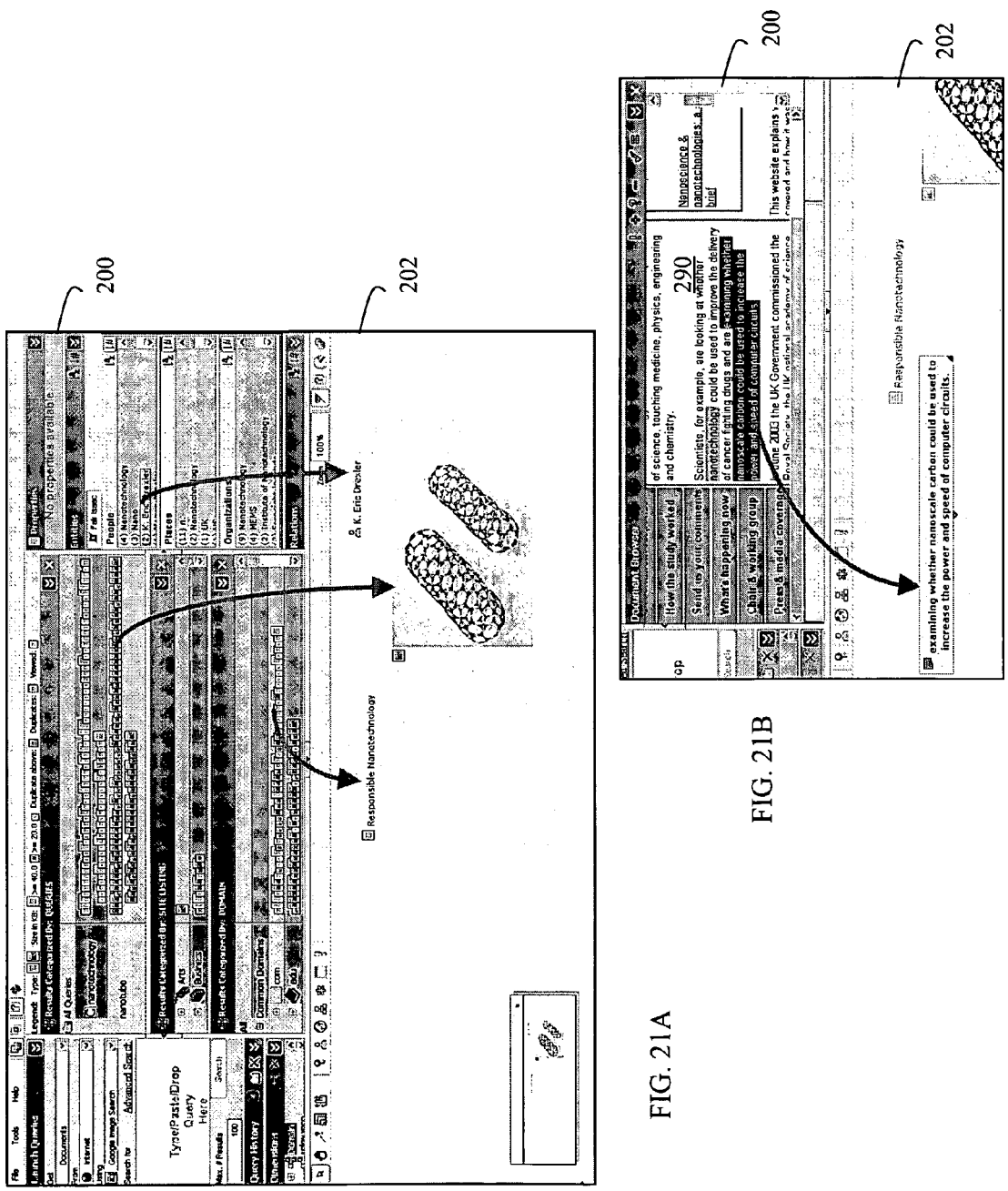
FIGS. 21A and 21B are representative views of the integrated tool of FIG. 2A showing drag and drop between the visualisation component and the analysis component.

Referring to FIGS. 9 and 21A-21B, an integrated visual analysis tool capable of visual representation of information content and relationships using layout and gestures (such as Sandbox 202) provides a space for visual thinking providing alternatives to paper for activities such as brainstorming, hypothesizing, evidence marshalling, fleshing out hypotheses with evidence, corroborating, grouping, annotating and prioritizing. Compact representations of knowledge allow the analyst to deal with more plausible scenarios than could have been done before. Easier exploration of knowledge results in discovery of more direct and indirect associations between people, places, organizations and events. Explicit thinking can help ensure more rigorous thinking and thus reduce the impact of some cognitive biases. Visual thinking can increase an analyst's cognitive span, and can also make it easier to communicate and facilitate collaboration. Seeing the big picture from many different perspectives at once helps the analyst make sense of a story line quickly and communicating it easily. Seeing what is being considered will show what is not being considered. Sandbox is a very tactile space with practically little visible interface, just the information. Direct manipulation increases the analyst's productivity by cutting drastically the amount of work needed to perform any action.

Direct manipulation and annotation are used to build and express meaning. Analysts can write anywhere, group anything, place anything anywhere, add and edit entities (e.g. people, organizations, places), add and edit information excerpts (e.g. snippets and whole reference documents, images) can be used and connections can be made. Thinking happens quickly and must not be frustrated by a burdensome medium that requires too much cognitive overhead to operate the tool 12. Sandbox 202 lets the analyst quickly, and with a minimum of buttons and little to no dialog boxes, create, edit, place, arrange, re-arrange, group, emphasize, highlight and compare the contained and displayed information excerpts and their connections to one another and to the information sources 14. Sandbox 202 is a thinking-centric place.

The analyst (user of the tool 12) can save any relevant information excerpt, including documents, snippets, images, tables, etc. simply by dragging them from the other areas of the visual representation 18 (e.g. TRIST 200—query results and/or documents) into Sandbox 202. References are automatically associated by an extraction module and therefore visually updated through a visualization renderer module to the representation 18, a snapshot of which can be saved in a storage of the system 100 if desired. Accordingly, a visual representation of the links of the excerpts to their original queries/document sources is done. Little to no time-consuming manual tracking of sources 14 is required. The user selects the information excerpt(s) in Sandbox 202 and its source will be highlighted in to the user (for example in TRIST 200), making it easy to check context and scan all the metadata associated with the original source 14 of the excerpt(s). This approach can also eliminate all the context switches that usually take place when collecting information and later going back its source.

With reference to FIGS. 21A and 21B, tool 12 supports a flexible drag and drop user interface to aid in evidence marshalling and report generation. Selected results can be dragged, representing their returned documents (FIG. 21A). Entities can be dragged (FIG. 21B); within TRIST 200 these will also retain their type, for example, as person, place or organization. From the document viewer, fragments of text can be dragged (FIG. 21B). This will create new representations that link back to the source document but are independent items. All of these can be dragged into Sandbox 202, or any other supporting software, where separate items can be gathered and manipulated outside of TRIST 200.

Sandbox 202 is a very tactile space with practically no visible interface, just the information and the thoughts. Direct manipulation increases the analyst's productivity by reducing the amount of work needed to perform any actions. Various automatic layout mechanisms (e.g. lists, grids, columns, and circular arrangements) for the information excerpts when contained in Sandbox 202 area are also available when there is no alternative, more meaningful layout apparent to the user. One of the strengths of nSpace is the flexibility it gives the analyst in pursuing the discovery of useful knowledge (in TRIST 200) and in following multiples lines of thoughts or trying multiple ways to marshal the evidence in Sandbox 202, all in a very fluid manner.

The tool 12 thus seeks to assist an analyst to collect, view, explore, understand and interact with, more information, more quickly and with more comprehension. Tool 12 is configured to improve the Human Information Interaction (HII)

element of IR tools and provides. Features and or advantages of the tool may comprise one or more of the following:

Query Comparison: comparative analysis of answers and content.
  Visible comparisons of multiple results, queries and query methods improves performance closes the feedback loop; quick visual indication of what is common, unique, new is provided; clear feedback means more efficient query reformulation and fewer, better changes.
Custom, Automatic, Multiple Categorization
  Analysts can define dimensions to reflect thought process and assumptions.
  Multiple dimensions of the problem are displayed and connected simultaneously,
  Automatic categorization may reveal themes contained in documents without the user having to open any document.
Rapid Scanning with Context:
  Linked, multi-dimensional views speed scanning of an order of magnitude more results.
  Quickly and correctly identify which documents, in result sets of hundreds, contain interesting/unique/relevant/useful information without having to open and read them. Deeper insight into results by seeing them from many different perspectives all at once.
Rapid interaction improves the process of exploring and understanding data.
  More possibilities (search strategies, hypotheses, etc.) can be considered more quickly.
  Unusual observations can be efficiently isolated and uninteresting results may be easily ignored.
Integration with Analysis Workspace (Sandbox).
  Faster sequence of steps from queries to results to snippets or documents in the Sandbox. Supports whole workflow (e.g. to perform evidence marshalling).
  Flexible workflow order, while seeking to minimize effort.

Although preferred embodiments of the invention have been described herein, it will be understood by those skilled in the art that variations may be made thereto without departing from the spirit of the invention or the scope of the appended claims.

We claim:

1. A computer implemented system for retrieving information content and presenting a multi-dimensional visual representation of the information content including unstructured data as a plurality of information objects, the system comprising:
  a storage for storing instructions for implementation by a processor;
  a query component for operation by the processor and configured to plan and execute at least two queries to obtain corresponding result sets from at least one of a plurality of information sources providing the information content as the unstructured data and coupled to communicate with the system, the result sets including the plurality of information objects;
  a dimension component for operation by the processor and configured to specify a plurality of dimension views with which to categorize the information objects of the result sets obtained from the unstructured data, each of said plurality of dimension views comprising at least one of dimensions pre-defined for the user, dimensions defined by a user, or dimensions defined automatically, wherein each of said dimension views includes respective information objects of said result sets and is configured to present different contexts of the plurality of information objects appropriate for unstructured data representation;
  a link selection component for operation by the processor and configured to provide visually emphasized indications to represent links among the plurality of information objects of the result sets of the at least two queries in each of the dimension views and to associate selected ones of said plurality of information objects visually emphasized in one of the dimension views with ones of the information objects visually emphasized in other ones of the dimension views to indicate a connection between said selected ones and said associated ones of the information objects; and
  a user interface component for operation by the processor and providing a graphical user interface configured to display corresponding result sets of the at least two queries, displaying the information objects of the corresponding result sets separated on the graphical user interface by query in a query view, and visually emphasized indications to represent links among the plurality of information objects of the result sets of the at least two queries in multi-dimensional linked views of the multi-dimensional visual representation.

2. The system of claim 1 wherein the user interface component is configured to visualize the dimensions in a dimension view.

3. The system of claim 1 comprising a dimension building component to configure dimension definitions in accordance with user input received via said user interface component.

4. The system of claim 3 wherein the dimension building component is coupled to communicate with at least one external ontological service with respect to the information content obtained from the plurality of information sources for receiving an imported ontology with which to configure a dimension definition.

5. The system of claim 3 wherein the dimension building component is coupled to communicate with at least one document clustering service for receiving categories with which to configure a dimension definition, said clustering service generating the categories in accordance with semantic analysis of one or more documents provided to said clustering service to generate the categories.

6. The system component of claim 1 wherein said query component is configured to receive the dimension and to define the at least two queries in accordance with the dimension.

7. The system of claim 1 wherein said query component is configured to plan and execute the at least two queries for entities and entity relations using at least one entity information source coupled to the system, said link selection component determining entity relation links among the results of the result set in accordance with the entities.

8. The system of claim 7 comprising a dimension building component to define dimensions, said dimension building component configured to receive the entities as a list of discovered entities as a result of entity extraction and using said user interface component to configure a dimension definition as a character dimension for the unstructured data of the information content.

9. The system of claim 8, wherein the entities are selected from the group consisting of people, places, and organizations.

10. The system of claim 7 wherein the user interface visualizes the entities and associated entity relations in an entities view and entity relation links in the multi-dimensional linked views.

11. The system of claim 10 wherein, in response to a selection of some of the results of a result set, the user interface component is configured to visualize in the entities view each of the entities located in the some of the results by name and indicating a number of occurrence within the some of the results, the plurality of information objects selected from the group including documents, entities, network links, and Web pages.

12. The system of claim 10 wherein the user interface is further configured to visualize each of the entities not located in the some of the results with a histogram representing a number of occurrence in the result set.

13. The system of claim 1 wherein said dimension component is configured to provide dimensions with which to characterize any of the result sets, wherein said link selection component is configured to further determine links between results of different result sets and wherein said user interface is configured to visualize the queries, results sets and links in said multi-dimensional views selectively in accordance with user input.

14. The system of claim 1 wherein the user interface and link selection component are adapted to receive a selection of one or more results visualized in a first multi-dimensional linked view and highlight the one or more results visualized in any other multi-dimensional linked view.

15. The system of claim 1 comprising a document browser component configured to view a document associated with a result of the result set, said browser to visualize at least some of the links determined by the link selection component.

16. The system of claim 15 wherein said user interface and link selection component cooperate with an analysis component to provide at least a portion of a document associated with the results of the result set for visualizing in a respective defined space in the visual representation, maintaining links for said at least a portion of a document to the result set such that a selection of said at least a portion of a document in the space highlights a corresponding visualization of the said at least a portion of a document in the multi-dimensional linked views.

17. The system of claim 1 wherein the system is adapted to persist the result set and links for subsequent visualization.

18. The system of claim 1 wherein the system is configured to monitor user activity and publish the activity to a Web service using a protocol.

19. The system of claim 1, wherein the visually emphasized indications are used to visualize explicit connections between the information objects such that the information objects include pairing of at least one of entities and documents or web pages, and documents or web pages and dimensions.

20. A method for retrieving information content and presenting a multi-dimensional visual representation of the information content including unstructured data as a plurality of information objects, the method including instructions stored on a storage for execution by a processor, the method comprising:
  obtaining result sets corresponding to at least two queries from at least one of a plurality of accessible information sources, the corresponding result sets including the plurality of information objects providing the information content as the unstructured data;
  specifying a plurality of dimension views with which to categorize the information objects of the result sets obtained from the unstructured data, each of said plurality of dimension views comprising at least one of dimensions pre-defined for the user, dimensions defined by a user, or dimensions defined automatically, such that each of said dimension views includes respective information objects of said result sets and is configured to present different contexts of the plurality of information objects;
  creating visually emphasized indications to represent links among the plurality of information objects of the result sets of the at least two queries in each of the dimension views and to associate selected ones of said plurality of information objects visually emphasized in one of the dimension views with ones of the information objects visually emphasized in other ones of the dimension views to indicate a connection between said selected ones and said associated ones of the information objects appropriate for the unstructured data representation; and
  visualizing corresponding result sets of the at least two queries, displaying the information objects of the corresponding result sets separated by query in a query view, and visually emphasized indications to represent links among the plurality of information objects of the result sets of the at least two queries in multi-dimensional linked views of the multi-dimensional visual representation on a user interface.

* * * * *